(12) United States Patent  
Ayoub et al.

(10) Patent No.: US 12,056,284 B2  
(45) Date of Patent: Aug. 6, 2024

(54) METHOD AND SYSTEM FOR GESTURE RECOGNITION

(71) Applicant: BrightSign Technology Limited, London (GB)

(72) Inventors: Hadeel Diaaeldin Ayoub, London (GB); Edward Richard Hill, London (GB)

(73) Assignee: BrightSign Technology Limited, London (GB)

( * ) Notice: Subject to any disclaimer, the term of this patent is extended or adjusted under 35 U.S.C. 154(b) by 112 days.

(21) Appl. No.: 17/786,390

(22) PCT Filed: Dec. 16, 2020

(86) PCT No.: PCT/GB2020/053243  
§ 371 (c)(1),  
(2) Date: Jun. 16, 2022

(87) PCT Pub. No.: WO2021/123772  
PCT Pub. Date: Jun. 24, 2021

(65) Prior Publication Data  
US 2023/0014068 A1 Jan. 19, 2023

(30) Foreign Application Priority Data  
Dec. 20, 2019 (GB) .................................. 1919046

(51) Int. Cl.  
*G08B 7/00* (2006.01)  
*G06F 3/01* (2006.01)

(52) U.S. Cl.  
CPC .............. *G06F 3/017* (2013.01); *G06F 3/014* (2013.01); *G06F 2218/12* (2023.01)

(58) Field of Classification Search  
CPC ...... G06F 3/017; G06F 3/014; G06F 2218/12; G06F 2218/10; G06V 40/28  
(Continued)

(56) References Cited

U.S. PATENT DOCUMENTS 5,714,698 A * 2/1998 Tokioka .................. G06F 3/014  
                                                            73/865.4  
9,069,385 B1 * 6/2015 Lynch ..................... G06F 3/014  
(Continued)

OTHER PUBLICATIONS

A. Corradini, "Dynamic Time Warping for Off-Line Recognition of a Small Gesture Vocabulary." Proceedings IEEE ICCV Workshop on Recognition, Analysis, and Tracking of Faces and Gestures in Real-Time Systems, pp. 82-89, 2001.  
(Continued)

*Primary Examiner* — Anh V La  
(74) *Attorney, Agent, or Firm* — Blank Rome LLP

(57) ABSTRACT

A method of gesture recognition is provided comprising: receiving data from each of a first sensor, a second sensor, a third sensor and a fourth sensor in a wearable glove device, data from the first sensor relating to movement of a thumb, data from the second sensor relating to movement of a first finger, data from the third sensor relating to movement of a middle finger and data from the fourth sensor relating to movement of a hand; forming an input sequence from the data; comparing the input sequence to each of a plurality of reference sequences by applying dynamic time warping to determine a similarity measure, wherein each reference sequence corresponds to an item in a stored vocabulary; and determining an output item from the stored vocabulary using the similarity measure.

17 Claims, 16 Drawing Sheets

(58) Field of Classification Search
USPC ..... 340/815.69, 815.4, 573.1; 704/3; 341/21
See application file for complete search history.

(56) References Cited

U.S. PATENT DOCUMENTS

| | | |
|---|---|---|
| 2010/0023314 A1* | 1/2010 | Hernandez-Rebollar ................... G10L 13/00 704/E13.001 |
| 2016/0162022 A1 | 6/2016 | Seth |
| 2017/0060411 A1 | 3/2017 | Phulwani et al. |
| 2018/0158370 A1* | 6/2018 | Pryor .................. G09B 21/009 |

OTHER PUBLICATIONS

G. Fang et al., "Large Vocabulary Sign Language Recognition Based on Hierarchical Decision Trees." ICMI '03: Proceedings of the 5$^{th}$ International Conference on Multimodal Interfaces, pp. 125-131 (2003). http://portal.acm.org/citation.cfm?id=958432. 958458.

S.S. Fels et al., "Glove-Talk: A Neural Network Interface Between a Data-Glove and a Speech Synthesizer." IEEE Transactions on Neural Networks vol. 4, No. 1, pp. 2-8, 1993.

G. Luzhnica et al., A Sliding Window Approach to Natural Hand Gesture Recognition Using a Custom Data Glove. 2016 IEEE Symposium on 3D User Interfaces (3DUI), pp. 81-90.

C. Oz et al., "American Sign Language Word Recognition with a Sensory Glove Using Artificial Neural Networks." Engineering Applications of Artificial Intelligence 24, No. 7, pp. 1204-1213, 2011. https://doi.org/10.1016/j.engappai.2011.06.015.

P. Premaratne, "Human Computer Interaction Using Hand Gestures." Springer Science & Business Media, Chapter 2, pp. 5-29, 2014.

The Makaton Charity, 2019, Makaton. https://www.makaton.org/.

The Raspberry Pi Foundation 2019, Raspberry Pi Zero W, https://www.raspberrypi.org/products/raspberry-pi-zero-w.

* cited by examiner

|   | i = 1 | i = 2 | i = 3 | ... | i = p |
|---|---|---|---|---|---|
| j = q | 4 | 0 | 1 | ... | 9 |
| ⋮ |   | ⋮ | ⋮ | ⋮ | ⋰ | ⋮ |
| j = 3 | 1 | 0 | 1 | ... | 14 |
| j = 2 | 0 | 1 | 3 | ... | 20 |
| j = 1 | 0 | 1 | 3 | ... | 20 |

Fig. 6(a)

METHOD AND SYSTEM FOR GESTURE RECOGNITION

FIELD

The present invention relates to a method and a system for gesture recognition.

BACKGROUND

Gesture recognition systems may be used to detect hand gestures used for communication, for example those used in various forms of sign language. For example, data gloves can be used to recognize hand gestures for the purpose of translating sign language. A data glove is a device comprising sensors attached to the fingers, joints or other parts of the glove. The sensors can be used to detect hand shapes. Hand shapes are one of the primitives of sign language and reflect the information of hand configuration. Hand shapes can be used to distinguish most signs.

A data glove may comprise sensors that dynamically track the hand shape and movement. Such devices can be used by non-verbal operators in a system configured to translate their hand gestures into a form such as speech or text that can be understood by the general public for example.

There is a continuing need to improve such systems. In particular, there is a need to provide systems that can accurately recognise gestures using models which are efficient in use of processing resources.

BRIEF DESCRIPTION OF FIGURES

Systems and methods in accordance with non-limiting examples will now be described with reference to the accompanying figures in which:

FIG. 6(a) shows a schematic illustration of a method of determining a measure of similarity between two sequences;

DETAILED DESCRIPTION

Figure 1:
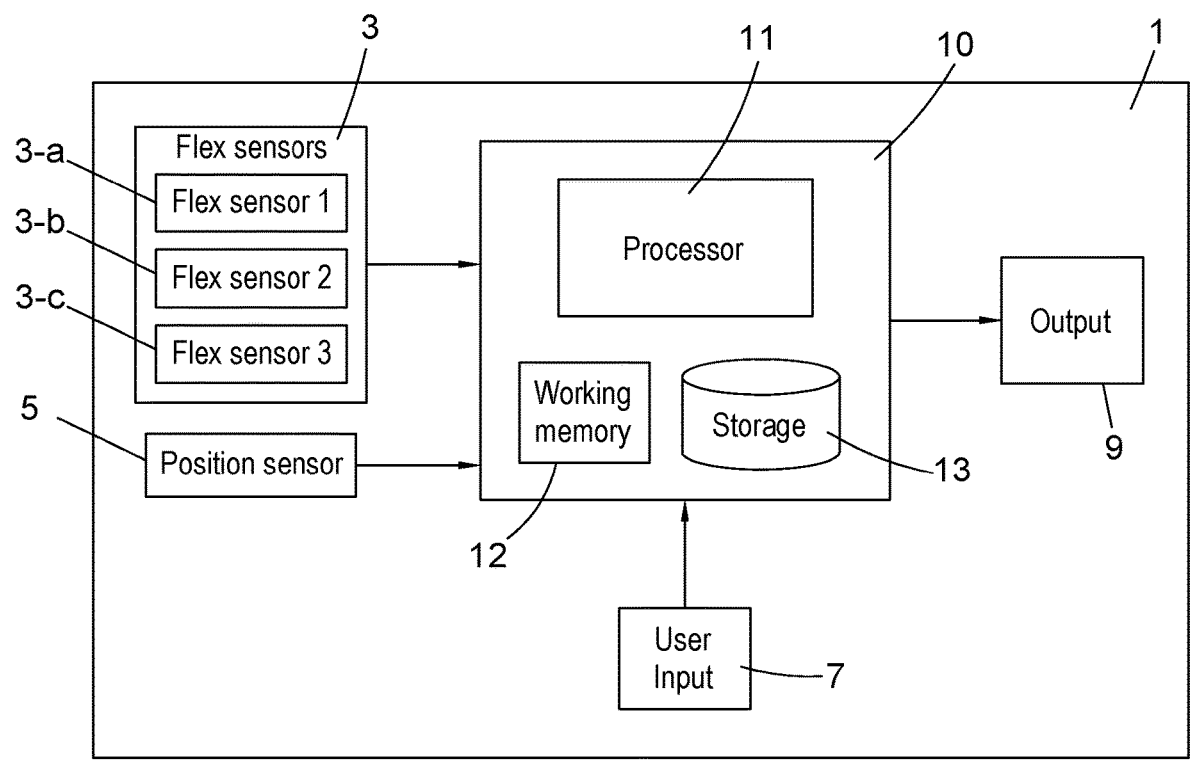
FIG. 1 shows a schematic illustration of a system for gesture recognition in accordance with an embodiment.

According to a first aspect, there is provided a method of gesture recognition comprising:
receiving data from each of a first sensor, a second sensor, a third sensor and a fourth sensor in a wearable glove device, data from the first sensor relating to movement of a thumb, data from the second sensor relating to movement of a first finger, data from the third sensor relating to movement of a middle finger and data from the fourth sensor relating to movement of a hand;
forming an input sequence from the data;
comparing the input sequence to each of a plurality of reference sequences by applying dynamic time warping to determine a similarity measure, wherein each reference sequence corresponds to an item in a stored vocabulary; and
determining an output item from the stored vocabulary using the similarity measure.

The fourth sensor comprises an accelerometer and/or a gyroscope. The first, second and third sensors comprise flex sensors.

In an embodiment, determining an output item comprises: ordering the reference sequences according to the similarity measures; selecting the K highest entries, where K is a pre-determined positive integer; and selecting the item that appears most often in the list of K highest entries as the output item.

In an embodiment, determining an output item comprises:
ordering the reference sequences according to their similarity measures;
selecting the reference sequence having a similarity measure corresponding to the highest similarity;
determining if the similarity measure of the selected reference sequence satisfies a threshold value;
if the similarity measure of the selected reference sequence satisfies the threshold value:
selecting the K highest entries, where K is a pre-determined positive integer, and
selecting the item that appears most often in the list of K highest entries as the output item.

In an embodiment, if the similarity measure of the selected reference sequence does not satisfy the threshold value, the input sequence is updated to correspond to a subsequent time window.

In an embodiment, the input sequence comprises a sequence of vectors, each vector comprising a value from each sensor, and each reference sequence comprises a sequence of vectors, each vector comprising a value from each sensor.

In an embodiment, applying dynamic time warping comprises determining a distance between a vector in the input sequence and a vector in the reference sequence.

In an embodiment, applying dynamic time warping further comprises:
reducing the dimension of the input sequence and the reference sequence;

determining a warp path of the reduced dimension input sequence and reference sequence, wherein determining the warp path comprises determining a distance between a vector in the reduced dimension input sequence and a vector in the reduced dimension reference sequence;

determining a similarity measure by limiting calculation to within a radius r of the warp path.

The items in the stored vocabulary may be text items, for example words. In an embodiment, an audio signal corresponding to the output item is retrieved and output.

A normalisation function may be applied to the elements of the input sequence for each sensor.

In an embodiment, the input sequence is formed by acquiring data from the sensors at a frame rate. The frame rate may be of greater than or equal to 4 frames per second. The frame rate may be of greater than or equal to 8 frames per second. The frame rate may be of greater than or equal to 10 frames per second. The frame rate may be of greater than or equal to 12 frames per second. The frame rate may be greater than or equal to 50 frames per second. The frame rate allows typical hand movements to be captured.

In an embodiment, the method further comprises performing a calibration step comprising: receiving data from each of the sensors corresponding to gestures configured to maximally exercise the sensors; determining the maximum and minimum values obtained from each sensor; and storing the maximum and minimum values.

In an embodiment, the method further comprises performing a training step comprising: receiving data from each of the sensors corresponding to a known item, forming a reference sequence from the data and storing the reference sequence. The training step is performed by the same user.

In an embodiment, one or more reference sequences are stored for each item. In an embodiment, two or more reference sequences are stored for each item.

In an embodiment, a first number of reference sequences is obtained corresponding to a first item, and wherein each of the first number of reference sequences is filtered to form a smoothed reference sequence. The first number of reference sequences may be combined to form a combined reference sequence. The first number of reference sequences may be combined using a Dynamic Time Warping Barycenter Averaging algorithm. Pairs of sequences from the first number of reference sequences may be combined according to their warp path.

According to a second aspect, there is provided a system for gesture recognition, comprising:
a first sensor in a glove device, the first sensor configured to measure data relating to movement of a thumb;
a second sensor in the glove device, the second sensor configured to measure data relating to movement of a first finger;
a third sensor in the glove device, the third sensor configured to measure data relating to movement of a middle finger;
a fourth sensor in the glove device, the fourth sensor configured to measure data relating to movement of the hand;
an output means configured to output an audio or visual signal corresponding to a determined item; and
a processor, configured to:
receive data from each of the sensors;
form an input sequence from the data;
compare the input sequence to each of a plurality of reference sequences by applying dynamic time warping to determine a similarity measure, wherein each reference sequence corresponds to an item in a stored vocabulary; and
determine an output item from the stored vocabulary using the similarity measure.

The output means may be located on the glove device. The processor may be located on the glove device.

According to a third aspect, there is provided a carrier medium comprising computer readable code configured to cause a computer to perform the above methods.

The methods are computer-implemented methods. Since some methods in accordance with examples can be implemented by software, some examples encompass computer code provided to a general purpose computer on any suitable carrier medium. The carrier medium can comprise any storage medium such as a CD ROM, a magnetic device or a programmable memory device, or any transient medium such as any signal e.g. an electrical, optical or microwave signal. The carrier medium may comprise a non-transitory computer readable storage medium.

Gesture recognition can be performed by using a glove based device comprising sensors that measure the configuration and movement of the hand. The sensors each provide a time sequence of measurements. These are then mapped to an item from a vocabulary, for example text corresponding to a sign. Classification of time sequences may be performed using various models, for example neural network based models which take the time sequence as input. However, running such models at a speed which is acceptable to the user often requires a large amount of processing resources, in particular working memory, to be available. For example, running such models requires various matrix operations to be performed, on large matrices, as the input time sequence data is fed through the model. Constraints on the processing resources available may arise however when the model is run on an embedded device for example, or on devices such as smart phones which have limited processing resources. Even where models are run in the cloud, running the models with low latency and with a separate model per user, means that potentially large amounts of cloud based resources are required to be allocated.

As will be described below, models that perform classification of a time sequence of measurements based on similarity measures can be run with constrained processing resources, at speeds which are acceptable to a user. By first obtaining similarity measures between the measured time sequence and reference time sequences corresponding to various signs, a classification can then be performed based on the similarity measures. For example, a K nearest neighbours classification can be performed. Such classification models can run on an embedded device. For example, the model can run on a data glove device.

Performance of signs may vary in speed, and even within one sign, some parts may be performed faster and some slower. Even with the same user, slight changes in speed may still occur each time a sign is performed. For example, some parts of the sign could be performed faster and some parts slower. This may impact the accuracy of a classification performed based on a similarity measure. For example, a similarity measure obtained by calculating a simple Euclidean distance between the two sequences may result in a low similarity for two identical sequences performed with different speeds. Dynamic time warping provides a measurement of similarity between two time sequences which may vary in speed.

FIG. 1 is a schematic illustration of a system 1 for gesture recognition in accordance with an embodiment. The system 1 is a wearable glove device 1. The glove device is a glove for the dominant hand of the operator. A single glove device for the dominant hand may be used for gesture recognition since, in signs using both hands, in the majority of cases, either both hands are the same or one hand stays motionless in holding one position, while the other hand makes the sign.

The glove device 1 comprises a computing unit 10. The computing unit 10 comprises a processor 11, working memory 12, and non-volatile memory, referred to as the storage unit 13. The glove device 1 also comprises a user input module 7 and an output module 9.

The processor 11 is coupled to the storage unit 13 and accesses the working memory 12. The processor 11 may comprise logic circuitry that responds to and processes the instructions in code loaded in the working memory 12. In particular, when executed, a method of gesture recognition is represented as a software product stored in the working memory 12 or RAM. The working memory 12 is located relatively close to the processor 11, with a dedicated data bus provided between it and the processor 11. The speed of execution is limited by the amount of data that can be stored in the working memory 12. The storage unit 13 comprises data that is used by the method of gesture recognition. Execution of the method of gesture recognition by the processor 11 will cause embodiments as described herein to be implemented. The computing unit 10 may be a compact computer such as a Raspberry Pi.

The processor 11 also accesses the input module 7 and the output module 9. The input and output modules or interfaces 7, 9 may be a single component or may be divided into a separate input interface 7 and a separate output interface 9. The input module 7 receives a request or instruction from an operator. The input module 7 may comprise a keyboard, one or more buttons, a touchscreen, or a microphone for example. The output module 9 may comprise a display unit such as a screen. In some embodiments, the output module 9 also comprises a loudspeaker.

The glove device 1 further comprises an array of flex sensors 3. Flex sensors may also be referred to as bend sensors. The array of flex sensors 3 comprises three flex sensor units 3-a, 3-b, and 3-c. A flex sensor is a sensor configured to measure an amount of deflection or bending. Each flex sensor unit is attached to a finger portion of the glove device such that bending or flexing of the wearer's finger results in the bending or flexing of the flex sensor unit attached to the finger portion of the glove. Thus, the bending or flexing of a finger is measured by each of the flex sensor units. In particular, a first flex sensor unit is attached to the receptacle that accommodates a thumb, a second flex sensor unit is attached to the receptacle that accommodates a first finger (index finger), and a third flex sensor unit is attached to the receptacle that accommodates a second finger (middle finger). When the glove device is worn by an operator, movement of the thumb, first finger, and/or second finger is transferred to the respective flex sensor units attached to the gloves. The flex sensors 3-a, 3-b, 3-c are configured to convert movement of the fingers and/or thumb into an electrical signal.

Although three flex sensors are illustrated in FIG. 1, additional flex sensors may be included in the device 1. For example, the device 1 may comprise four flex sensors, where the additional flex sensor is attached to the receptacle that accommodates the fourth finger (little finger). The device 1 may comprise five flex sensors, where the additional flex sensor is attached to the receptacle that accommodates the third finger (ring finger).

The flex sensors may be resistive flex sensors for example. Such flex sensors comprise a variable resistor, where the resistance increases as the sensor is bent. For example, the flex sensor may comprise a flexible substrate coated with a polymer ink comprising embedded conductive particles. The flex sensor further comprises two terminals, where each terminal is connected to different points of the polymer ink. When the flex sensor unit is in a flat configuration, a first resistance value is measurable across the two terminals. When the flex sensor is bent in use, a resistance value greater than the first resistance value is measurable. The larger the amount of bending, the larger the resistance measured between the two terminals. In an example, the first resistance value is between 1 k$\Omega$ and 30 k$\Omega$ and, when the flex sensor unit is bent, the resistance value measured across the two terminals increases to about 50 k-70 k$\Omega$ for example. The amount of bending of each flex sensor is measured by connecting the flex sensor to a reference resistor in a voltage divider arrangement and measuring the voltage dropped over the flex sensor as gestures are made with the glove device 1 and the flex sensor unit is bent. The magnitude of the measured voltage indicates the amount of bend of the finger/thumb. The SpectraSymbol flex Sensor (2.2") is an example of a flex sensor which may be used in system 1.

Alternatively, the flex sensors may be capacitive flex sensors. Such flex sensors comprise a variable capacitance, where the capacitance changes as the sensor is deformed. Such sensors may also be referred to as stretch sensors. Capacitive flex sensors comprise an extendable signal electrode between two opposing ground electrodes, which are separated by a dielectric insulator. In an example, the signal and/or ground electrodes comprise a stretchable graphene-silicone rubber composite. The sensor can be thought of as a flexible parallel plate capacitor, wherein upon stretching, the area is increased and the thickness is reduced, causing an increase in capacitance ($C=\epsilon A/d$). Deforming the flex sensor by the bending or flexing of a finger/thumb by the operator causes the sensor to extend (relative to when the sensor is in a flat configuration) and causes an increase in capacitance. The change in capacitance may be measured by applying a voltage across the capacitor electrodes connected in series with a fixed capacitor and measuring the voltage across one of the capacitors. The StretchFABRIC Sensing Element (SSD18) produced by StretchSense is an example of a flex sensor which may be used in the system 1.

The output signal generated by each flex sensor unit is sampled by an analog-to-digital converter (not shown) and output to the computing unit 10. As described above, the output signal from each sensor may be a voltage signal for example. An example of an analog-to-digital converter is the MCP3008 by Microchip.

The glove device 1 further comprises a hand movement sensor 5. The hand movement sensor 5 is attached to the glove device 1 in a region corresponding to the back of the hand. The hand movement sensor 5 provides information about the movement of the hand. For example, the hand movement sensor 5 provides information about movement along three spatial directions.

An example of a hand movement sensor 5 is an accelerometer, for example a tri-axis accelerometer. A tri-axis accelerometer provides information about acceleration in three different directions. In an example, the three directions are orthogonal. The accelerometer may comprise piezoelectric sensor components or capacitive sensor components for example. Both such components output a voltage signal. A tri-axis accelerometer thus outputs a voltage signal for each direction. An analog-to-digital converter is used to convert the signal before outputting it to the computing unit 10, as described above in relation to the flex sensor units. Alternatively, the tri-axis accelerometer comprises a digital interface and outputs the signals using a digital serial communication protocol according to the I$^2$C protocol for example. Information about acceleration in each direction is encoded in the digital signal. An example of a tri-axis accelerometer with a digital interface is the Analog Devices ADXL345. When the tri-axis accelerometer comprises a digital interface, the accelerometer is directly connected to the computing unit 10 and the accelerometer information is acquired and sent to the computing unit 10 whenever the computing unit 10 requests information.

Alternatively, the hand movement sensor 5 is a gyroscope, for example a tri-axis gyroscope that measures the angular velocity in three different directions. The three axes of rotation are referred to as the roll, pitch, and yaw for example. Similar to the tri-axis accelerometer, the tri-axis gyroscope may output varying voltages or may comprise a digital interface that outputs angular velocity information according to the I$^2$C protocol for example. An example of a tri-axis gyroscope with a digital interface is the InvenSense IAM-20380.

More than one hand movement sensor may be included in the device 1. For example, a gyroscope and an accelerometer may both be included in the device. An inertial measurement unit (IMU) which combines an accelerometer and a gyroscope to provide information about linear acceleration in three directions as well as rotation in three directions may be used. An IMU comprises a digital interface that outputs linear acceleration and angular velocity information according to the I$^2$C protocol for example. An example of an IMU is the MPU-6050 by InvenSense.

The hand movement sensor may be integrated onto a PCB located in a region of the glove corresponding to the back of the hand.

In the system 1 illustrated in FIG. 1, all of the components of the system are integrated into the wearable glove device 1. The processing steps described below to detect signs are performed on the wearable glove device 1. Furthermore, an audio signal corresponding to the detected sign is retrieved or generated on device, and output from the loudspeaker. The system is a wireless and standalone data-glove.

However, in alternative embodiments, the system further comprises elements external to the wearable glove device. For example, in some embodiments, the system further comprises an external computing device such as a smart phone or tablet for example. In such systems, the computing unit 10 and the external computing device are configured to communicate with each other using a wireless connection, for example a Bluetooth connection. In this case, the wearable glove device comprises further components to enable communication with the external computing device, for example a Bluetooth module. For example a Bluetooth Low Energy (BLE) chip may be included in the flexible glove hand PCB in order to send sensor data to a smart device.

The computing unit 10 in such embodiments may be a micro-controller such as an Arduino. In such systems, data from the sensors is output to the computing unit 10 as described previously. Some pre-processing, for example filtering of the signals, may be performed on the computing unit 10. However, the data is transmitted to the external computing device. The processing steps described below to detect signs are performed on the external computing device. An audio signal corresponding to the detected sign is also retrieved or generated on the external computing device. An audio signal may be output at the external computing device. Alternatively, the audio signal may be transmitted back to the wearable glove device and output from a loudspeaker located on the glove. Alternatively, the audio signal for each gesture in a library of signs may be transmitted to the wearable glove device in a batch and locally stored, such that the external computing device would trigger the playback of the audio signal on the wearable glove device, rather than streaming the audio signal at classification time.

When implemented using an external computing device, such as a smart device, an app may be run on the smart device enabling users to save their gesture data under a label of their choice, allowing them to build and edit a personal library of signs. The app may also provide further personalization options, including the ability to modify the language and gender of an output voice.

Figure 2A:
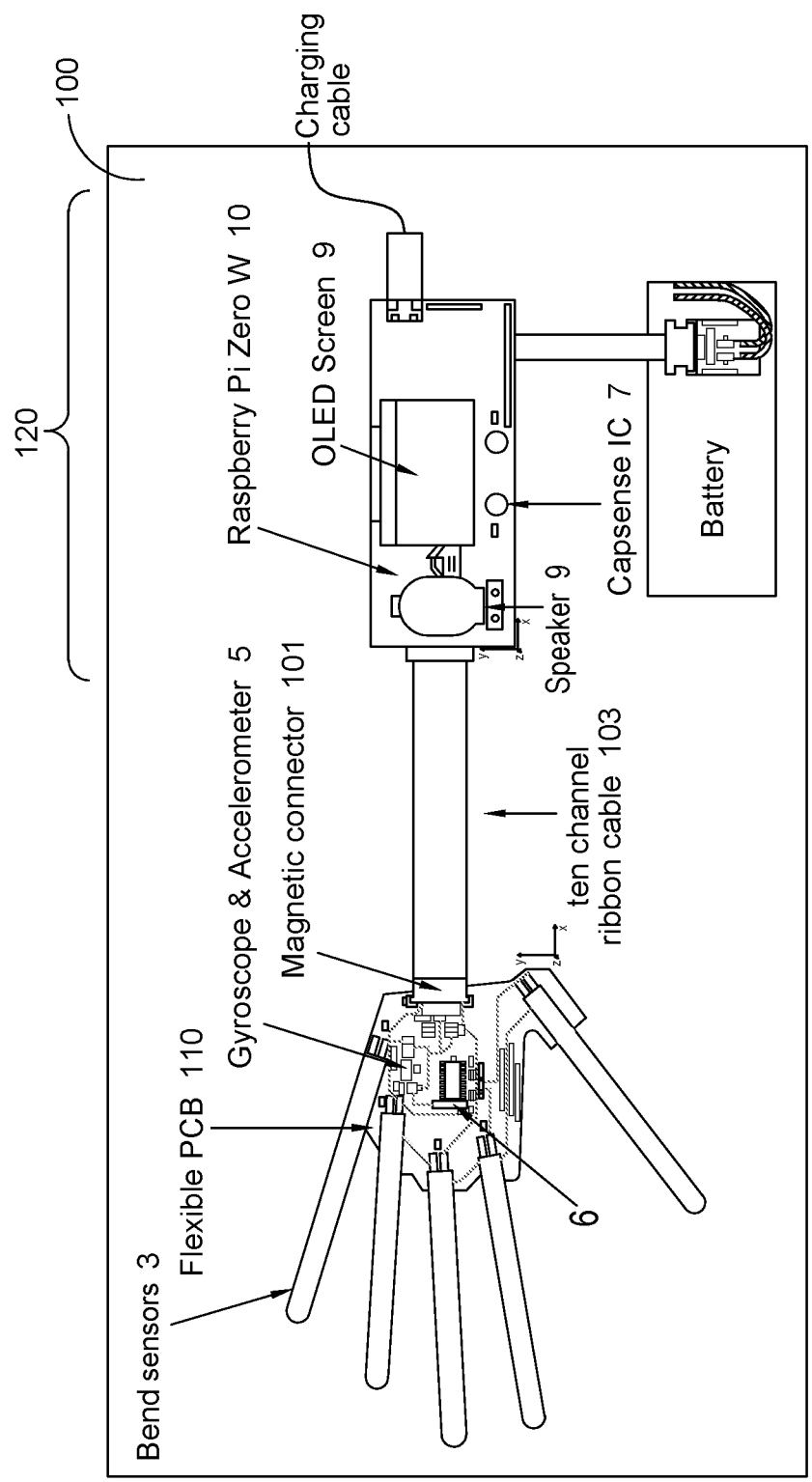
FIG. 2(a) shows a schematic illustration of a system for gesture recognition in accordance with an embodiment.
Figure 2B:
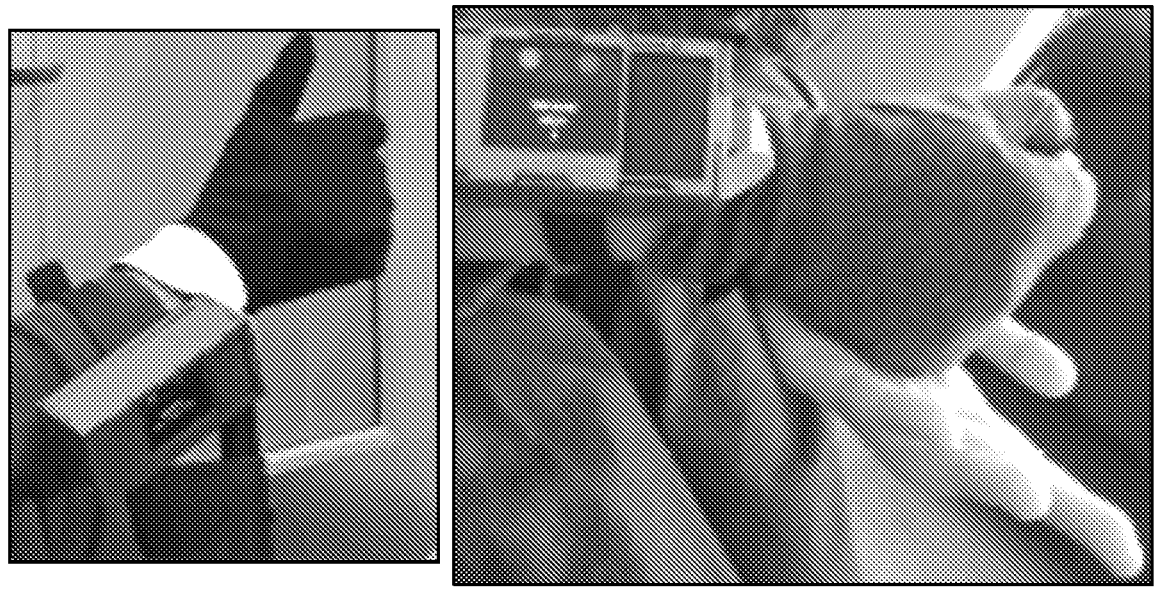
FIGS. 2(b) and 2(c) show examples of a system for gesture recognition in accordance with the embodiment shown in FIG. 2(a)

FIG. 2 is a schematic illustration of a system 100 in accordance with another embodiment. The system 100 is a wearable glove device. The glove device 100 comprises a Raspberry Pi Zero W computing unit 10, a touch sensitive input module 7, and a speaker and OLED screen for output 9. The device comprises a wearable glove component. FIGS. 2(*b*) and 2(*c*) show a photograph of the actual device.

The glove device 100 further comprises a flex sensor array 3 of five flex sensors, where each flex sensor is attached to the finger portion of the glove corresponding to the thumb and first to fourth fingers. The flex sensors 3 are resistive flex sensors such as have been described in relation to FIG. 1. The glove device 100 further comprises a tri-axis gyroscope and a tri-axis accelerometer as hand movement sensors 5. Example gyroscopes and accelerometers that may be used are described in relation to FIG. 1. For example, an inertial measurement unit (IMU) which combines an accelerometer and a gyroscope may be used.

The flex sensors 3 and the hand movement sensors 5 are connected to a flexible printed circuit board (PCB) 110. The flexible PCB 110 and the mounted sensors are embedded within a lining of the glove device such that they are not exposed to the operator. For safe wearing of the device, all sensors are embedded within an inner lining of the glove textiles. The PCB 110 comprises an ADC 6 such as described in relation to FIG. 1. The PCB 110 comprises patterned electrical conductors that connect the terminals of the bend sensors 3 to the inputs of the ADC 6, the outputs of the ADC 6 to the connector 101, and the outputs of the hand movement sensor 5 to the connector 101. The connector 101 is configured to connect to a multi-channel ribbon cable 103 that connects the flexible PCB 110 to wrist portion 120 of the glove device 1. In an example, the ribbon connector 103 is magnetically attached to the connector 101 on the PCB 110. For example, the ribbon connector 103 is a ten channel ribbon connector, with one channel allocated to each of the five flex sensors.

When the hand movement sensor 5 is an IMU (for example an MPU-6050) as described above, the hand movement sensor 5 has a digital serial output, with one or more wires allocated to the output of the hand movement sensor 5. From the digital serial output of the hand movement sensor 5, three channels providing the accelerations in three directions of the hand movement sensor, and three channels providing rotation in three directions are obtained. The outputs from each of the five flex sensors, the three acceleration channels and the three rotation channels from the IMU, are directed to the micro-controller 10. In the example, there are 10 wires in the ribbon connector, however, 11 channels are transmitted: 5 flex sensor channels, 3 (X,Y,Z)

accelerometer channels and 3 (X,Y,X) gyro channels, since the IMU used in the example has a digital serial output.

The device hardware comprises three primary units: a micro-controller, in this case a Raspberry Pi Zero W, a circuit board comprising the speaker, display and a microcontroller, and a hand-shaped, flexible PCB comprising the various sensors used. The circuit board comprising the speaker and display and the microcontroller are soldered together on top of one another, with the flexible PCB connected to this main assembly via a short ribbon cable. The flexible PCB comprises five flex sensors, one accelerometer and one gyroscope. The accelerometer and gyroscope are on the same physical integrated circuit in the centre of the back of the hand. The values from the flex sensors are transmitted to the microcontroller in raw form, with the accelerometer and gyroscope unit connected via an $I^2C$ bus.

The micro-controller 10 polls the bend sensors 3 and the hand movement sensors 5. For example, the micro-controller 10 acquires a reading from the hand movement sensor 5 and from the bend sensors 3 at a rate of (1/ts), where (1/ts) is described further below. The pins on the microcontroller 10 are connected to the IMU and digitally converted flex sensors. The values from the sensors are polled by the microcontroller 10, and code, including for classification, is run on the microcontroller 10.

The micro-controller 10 may be further configured to filter the signals output by the hand movement sensor 5 and the signals output by the ADC 6 connected to the bend sensors 3. For example, the micro-controller applies a moving average filter to the signal from each sensor. The moving average filter is used to smooth the data output by each sensor. The output of the moving average filter at a time instant i, y[i], is given by the average of n previous inputs x. For example, y[i] is obtained as $y[i]=(1/n)\times_{j=0}\Sigma^{n-1}x[i+j]$. The term n represents the number of points used to determine the average, and, for example, n is between 3 and 5 when the sampling rate (1/ts) is 60 Hz. When the sampling rate (1/ts) is much lower than 60 Hz, n may be 1 (no filtering) or 2. When the sampling rate (1/ts) is much higher than 60 Hz, n may be greater than 5. If a moving-average filter is applied, it is done on the microcontroller 10 immediately after the values are read in, and before addition of the data to a memory buffer for classification.

The wrist portion 120 of the glove device 100 comprises a wrist band 201 attached to a housing 203. The wrist band 201 is configured to attach the housing onto an operator's wrist. The wrist band may be a hard-case wrist band. The housing is configured to hold the Raspberry Pi Zero W computing unit 10, and a PCB comprising the speaker and OLED screen for output 9, two touch sensitive buttons 7, and a power source. The housing is sealed except for openings around the screen, speaker and buttons. The power source comprises a rechargeable battery that can be charged using a USB without opening the housing. The power source powers components on the glove device 100 including the flex and hand movement sensors, and components on the wrist portion 120 including the computing unit 10 and the screen and speaker 9.

Although in the device shown in FIG. 2, communication between the components on the flexible PCB 110 and the computing unit 10 on the wrist portion 120 uses a magnetic connector 101 and ten channel ribbon cable 103, alternatively a wireless connection is used for communication between the components on the flexible PCB 110 and the computing unit 10 on the wrist portion 120. In an example, the wireless connection is a Bluetooth connection. When a wireless connection is used, a power source is provided on the flexible PCB 110. Alternatively, all of the sensor values may be serialised, for example using an application-specific integrated circuit or microprocessor located on the flexible PCB, to allow the data from all sensors to be transmitted down a fewer number of wires, for example 2 or 3 wires.

Although the device shown in FIG. 2 comprises a flexible PCB 110, alternatively, all the components other than the flex sensors can be mounted on a rigid PCB, with wires running from the flex sensors to the rigid PCB. The wires running between the PCB and the flex sensors may be sown into the glove.

As has been described above in relation to FIG. 1, the system may further comprise an external computing unit such as a smartphone or tablet. In such devices, various components and functions of the wrist portion 120 are replaced by the external computing device. The glove device 100 comprises a communication module, for example a Bluetooth module. Data from the sensors is processed by a microcontroller 10, which may be located on the PCB 110. Data is sent via the communication module to the external computing device. The output means 9 (the speaker and OLED screen) are replaced by a speaker and display of the external computing device, e.g. smartphone. Alternatively, the speaker 9 is provided on the PCB 110 and audio signals are transmitted from the external computing device to the glove device 100 and the output is provided by the speaker 9 disposed on the PCB 110. In this arrangement, the microcontroller may be an Arduino for example, which polls the sensors and then sends the data out over a Bluetooth connection to the external device for processing. If a moving-average filter is applied, it is done so on the Arduino immediately after the values are read in, and before transmission for classification.

In the device shown in FIG. 2, a gyroscope and an accelerometer are provided in an IMU as hand movement sensor 5. However, the IMU may further comprise a magnetometer as an additional hand movement sensor. A magnetometer detects the orientation of the glove device 1 relative to the Earth's magnetic field. Measurement of changes in the output of the magnetometer relative to the output at the beginning of a sequence provides information about the glove device 1 orientation when a sign is performed.

Although a device having five flex sensors is shown, various numbers of flex sensors can be used, for example three flex sensors, where each of the flex sensors is attached to the finger portion of the glove corresponding to the thumb and first and second fingers; or four flex sensors, where each of the flex sensors is attached to the finger portion of the glove corresponding to the thumb, first to second finger and fourth finger.

More than five flex sensors may be used, for example seven flex sensors. In this case, three of the flex sensors are attached to the finger portion of the glove corresponding to the thumb. Each of the remaining flex sensors is attached to the finger portion corresponding to the first to four fingers. The three flex sensor units attached to the finger portion corresponding to the thumb are disposed such that information about different directions of bending are measurable. In an example, the three flex sensor units on the thumb portion provide information about the bending of the thumb (from a relaxed to a clenched configuration) as well as sideways movement of the thumb.

There may be more than seven flex sensors, for example the flex sensor array 3 may comprise fifteen flex sensor units, with three units attached to the finger portion corresponding to each finger, so that bending (from a relaxed to a clenched configuration) as well as lateral movement of each finger can be measured.

Where more than five flex sensors are used, the multi-channel cable 103 and connector 101 is modified from that of FIG. 2 so that further channels are included, or the multichannel cable 103 is replaced by a wireless connection as described above. Alternatively, extra circuitry may be added to serialise all of the sensor values on the flexible PCB and then transmit them down a small number of wires at a high rate, and then interpret them back into the individual values on the main circuit with the processor, doing this interpretation either in hardware or software.

The glove device may further comprise one or more splay sensors. Splay sensors are similar to the stretch sensors described above except that they comprise multiple electrode segments. As the sensor is bent, the capacitance between different pairs of electrode segments changes. Splay sensors are suitable for capturing lateral motion of fingers. An example of a splay sensor is the StretchSense 3-Channel Silicone Sensor.

Additionally or alternatively, the glove device may further comprise a compression sensor. A compression sensor provides a signal that changes when a load is applied. For example, the pressure sensor is a capacitive sensor whose capacitance changes as a load is applied. Pressure sensors may be disposed between adjacent fingers to detect lateral movement of adjacent fingers when the fingers are brought close together or separated (splayed) for example. An example of a compression sensor is the OSEC compression sensing element by StretchSense.

Additionally or alternatively, the glove device further comprises pressure sensors disposed at the fingertip position of the finger portion. The pressure sensors detect when a pressure or force is applied. In an example, the pressure sensor is a force sensitive resistor which exhibits a change in resistance when a force is applied. In one example, the change in resistance is measured by applying a voltage to the pressure sensor connected in series to another fixed resistor and measuring the voltage across the pressure sensor. An example of a pressure sensor is the TouchMicro-10 v1.0.

FIG. 3(*a*) to (*d*) show examples of raw signals obtained by various sensors. Raw signals refer to signals that are obtained by the micro-controller 10 of FIG. 2(*a*). The raw signals are signals from accelerometer 5 and from the ADC 6 connected to the flex sensors 3 that have been filtered by the moving average filter implemented on the micro-controller 10. In the FIGS. 3(*a*) to (*d*), the traces numbered by "0" to "4" show the signal from the bend sensors, while traces "5" and "6" show the signal from two directions of the accelerometer 5.

FIG. 3(*a*) shows examples of the signals obtained from four different users when they all performed the sign for "good morning". All the fingers for this sign remain in a relatively consistent state of bending and hence the traces here relate primarily to changes in the accelerometer output. For example, in the bottom left figure, at times corresponding to 10, 14 and 20 samples, "impact" can be identified where the hand changes direction. The acceleration values between those points represent the changing motion of the hand.

FIG. 3(*b*) shows two examples of the signals obtained from two different users when they both performed the sign for "thank you".

FIG. 3(*c*) shows examples of the signals obtained from a user who performed two similar signs with different meanings, "Please" and "Thank You". Although the gestures are similar, traces "5" and "6" show different profiles. The signs 'Please' and 'Thank you' utilize the same hand shape, and differ largely solely in duration.

FIG. 3(*d*) shows examples of the signals obtained from a user who performed two similar signs "Please" and "Stop", where the gestures differ only in orientation. The signs 'Please' and 'Stop' utilize the same hand shape (detected by the flex sensors) and motion (detected by the accelerometer and gyroscope), with only a difference in orientation. Including sensors that can identify such differences, for example a magnetometer, can improve accuracy in distinguishing between such signs.

Figure 4:
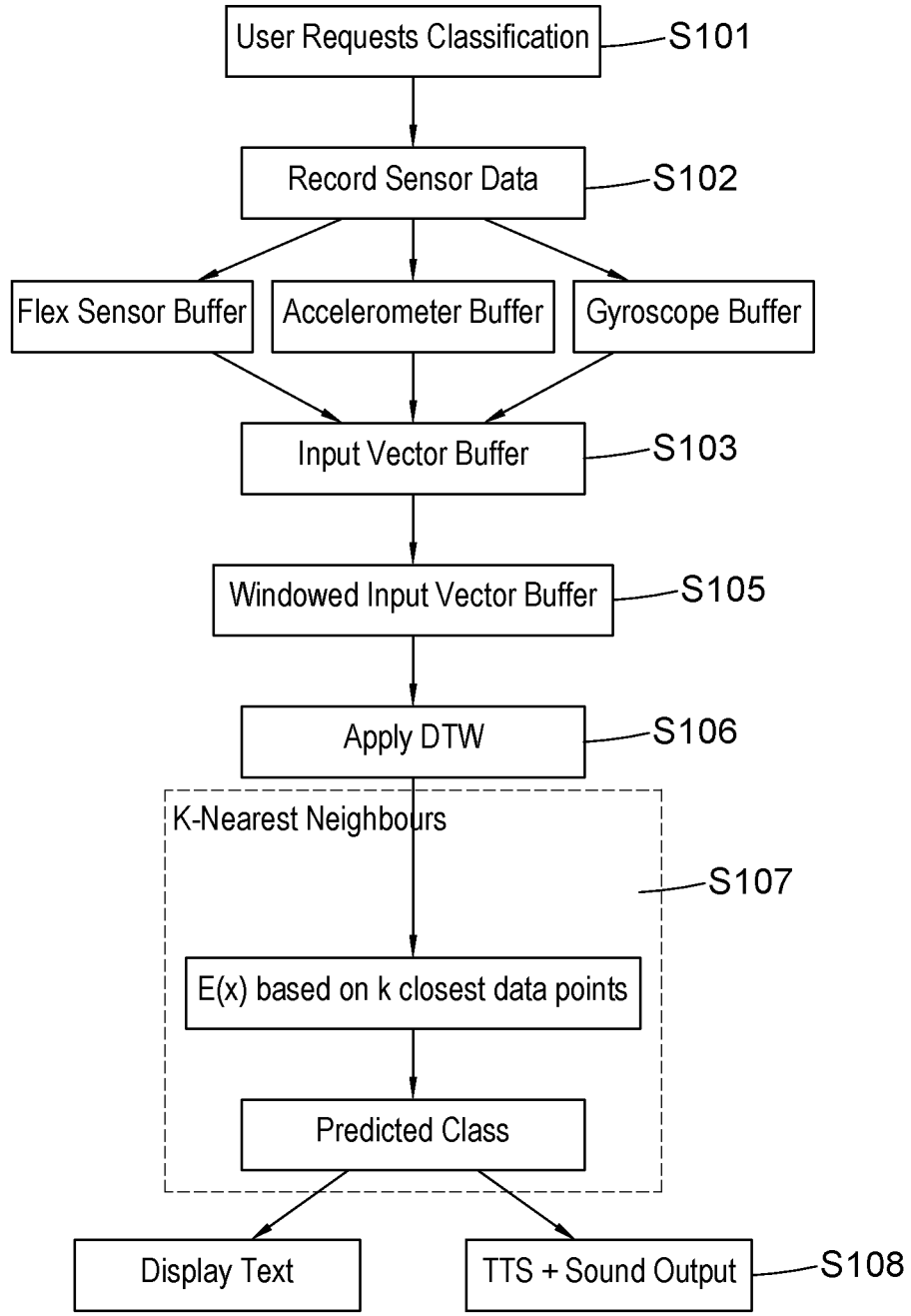
FIG. 4 shows a schematic illustration of a method of gesture recognition in accordance with an embodiment.

FIG. 4 shows a flow chart of a method of gesture recognition according to an embodiment. The method may be performed by the system of FIG. 1 or FIG. 2 for example.

In this method, the user starts the classification by providing an input request for classification of a sign. The request is provided using the input means 7, for example by pressing a button indicating that classification should begin. Upon receiving the user-inputted request in step S101, the steps S102 to S108 as shown in FIG. 4 are carried out. In an alternative embodiment, the outputs of the flex sensors 3 and/or the hand movement sensor 5 is used to start the classification steps of S102 to S108. For example, when the output of one of the sensors is detected as being greater than a threshold value, the classification steps are started. Alternatively, the classification steps can be started when one or more sensor values corresponding to a particular configuration are detected either at an instant, or where the values remain within certain bounds for a period of time. For example, the classification can be started when one or more sensor values correspond to a configuration of the hand being clenched for a second.

In step S102, the sensors acquire data for an acquisition time $T_A$. Within this time window, $T_A$, each sensor measures one or more data points at a frame rate of (1/ts), where ts is the time separation between consecutive measurements in seconds. One frame corresponds to one data-point from each sensor. The total number of measurements, M, for each sensor is the product of the frame rate and the time window such that $M = T_A/ts$. The temporal separation between the measurements for each sensor is selected to be small enough to capture changes in a hand gesture accurately. Typically, hand movements occur at a rate of 6-7 movements/second. In an embodiment, the frame rate is greater than or equal to 4 frames/second. Acquiring four "key frames" from which the positions can be assumed allows capturing of the sign. In another embodiment, the frame rate is greater than or equal to 20 frames/second. In a further embodiment, the frame rate is greater than or equal to 50 frames/second.

The acquisition time $T_A$ may be defined by the user, who provides a further input (for example pushing a second button) to stop the recording of data once they have finished performing the sign. Alternatively a fixed acquisition time may be used. For example, an acquisition time of 2 seconds has been found to provide good performance. In another embodiment, the value for $T_A$ is obtained based on data from the training stage. The training stage is described further below in relation to FIG. 9 (*b*).

FIG. 5 (*a*) shows a schematic illustration of the signal acquired from N sensors, for example the signals from the N sensors obtained by the micro-controller 10 as described in relation to FIG. 2. Each sensor provides a time varying signal. The time varying signal is converted to a sequence of data points by sampling the signal at a frame rate of (1/ts) as described above, i.e. once every ts time period.

In step S103, the measured data points from the sensors for each time instant (frame) are combined into an input vector X. Vector X is also referred to as an input frame. An input frame comprises the output data from all N sensors at a time instant. Each vector X is an N dimensional vector and comprises elements $d_1^{(m)}, d_2^{(m)} \ldots d_N^{(m)}$. Element $d_1^{(m)}$ is a data point from the first sensor, $d_2^{(m)}$ is a data point from the second sensor, and $d_N^{(m)}$ is a data point from the $N^{th}$ sensor. The superscript (m) corresponds to the frame number and m corresponds to frame 1, 2, ... M within the acquisition time $T_A$.

Data points $d_1^{(m)}, d_2^{(m)} \ldots d_N^{(m)}$ from different sensors may each have values which lie in different ranges. For example, for some sensors, measured data points have values that are positive and negative, and for other sensors, measured data points have values that are either positive or negative. Optionally, the measured data points $d_1^{(m)}, d_2^{(m)} \ldots d_N^{(m)}$ from each sensor are normalised so that they are on a common scale. For example, for the $n^{th}$ sensor, normalisation is carried out by using the following operation: $(d_n-\min_n)/(\max_n-\min_n)$, where $\max_n$ and $\min_n$ are the maximum and minimum sensor outputs of the $n^{th}$ sensor measured during a calibration stage, described in relation to FIG. 9 (a) below. By normalising the sensor outputs, the contribution of one or more sensors does not unduly skew the classification. Alternatively, a normalisation that is similar to the previous example except that any values of $r_n$ outside the calibraton range between $\max_n$ and $\min_n$ are clamped to $\max_n$ or $\min_n$. Alternatively, other normalisations that treat outliers differently could be used.

In step S105, step S103 is repeated for each of the M measurements acquired in S102 to form a sequence of input frames X. FIG. 5 (b) shows a schematic illustration of a sequence of input frames $X^{(1)}, X^{(2)} \ldots X^{(M)}$ corresponding to frames 1, 2, ... M respectively. The M frames of input vectors $X^{(1)}, X^{(2)} \ldots X^{(M)}$ represent the input sequence of the N sensors.

In Step S106, a similarity measure, or distance, between an input sequence of vectors $X^{(1)}, X^{(2)} \ldots X^{(M)}$, corresponding to frames 1, 2, ... M respectively, and each of a plurality of reference sequences of vectors is computed. The distance represents how similar the measured sequence is relative to each of the reference sequences. The reference sequences each represent a sign and are stored in a vocabulary of signs. The stored vocabulary of signs is stored in the storage unit 13 of the computing unit 10 for example. The distance is computed using a dynamic time warping (DTW) algorithm. The DTW algorithm provides a measure of similarity between two temporal sequences, namely the input sequence and a reference sequence from the vocabulary. The DTW is effective when the sequences have differences in their temporal alignment, for example, if the measured sequence corresponds to a hand gesture that was made quickly, while the reference sequence corresponds to the same hand gesture but made slowly. The determination of a similarity between an input sequence and a reference sequence using the DTW algorithm will be described further below in relation to FIGS. 6 and 7.

In step S107, the distance measures obtained in S106 are used to determine an output sign from the stored vocabulary. The classification of the measured signal into one of the signs in the stored vocabulary is performed using a K-nearest neighbours (K-NN) algorithm. The K-NN algorithm is described further below in relation to FIG. 6(c).

In step S108, the sign that is determined to match the input sequence is outputted using the output means 9. When the output means 9 comprises a speaker, the stored vocabulary comprises a sound file that corresponds to each stored sign. Alternatively, a text signal may be displayed corresponding to the selected sign. Alternatively or as well as audio or text output, another item such an image may be displayed. Alternatively, an item such as sound file or an API request may be sent to another system, such as a personal assistant device, that a non-speaking user would otherwise have difficulty operating. The sound file, text signal, or API request is also referred to as an item.

The method described above is based on a K Nearest Neighbours classifier using Dynamic Time Warping (DTW) as a distance metric between time series. K nearest neighbours is taken to include the case where K=1, in other words a Nearest Neighbour classification. Although a K-Nearest Neighbour classification is used in this example, other types of classification based on similarity measures may be used. For example, a neural network could be used to draw some classification boundary at a different distance around each point. Alternatively, for example, the distance metrics can be weighted (either linearly or by some other function) to encourage classification towards certain signs. In yet another example, the distance metrics can be weighted and used with a Markov Model based on the immediately previous items classified (or any other model for predicting the next sign) to help identify the most likely next sign.

Figure 6B:
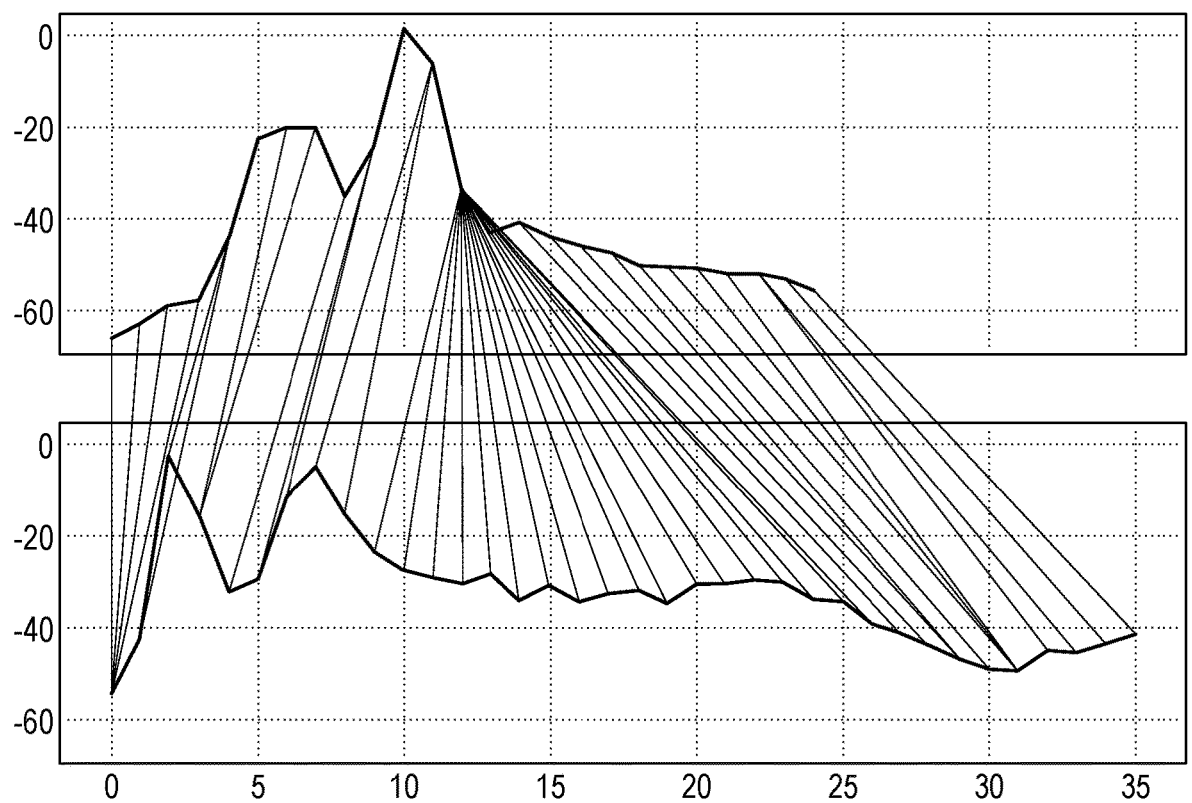
FIG. 6(b) shows a schematic illustration of the correspondence between the points in two sequences along the determined warp path.
Figure 6C:
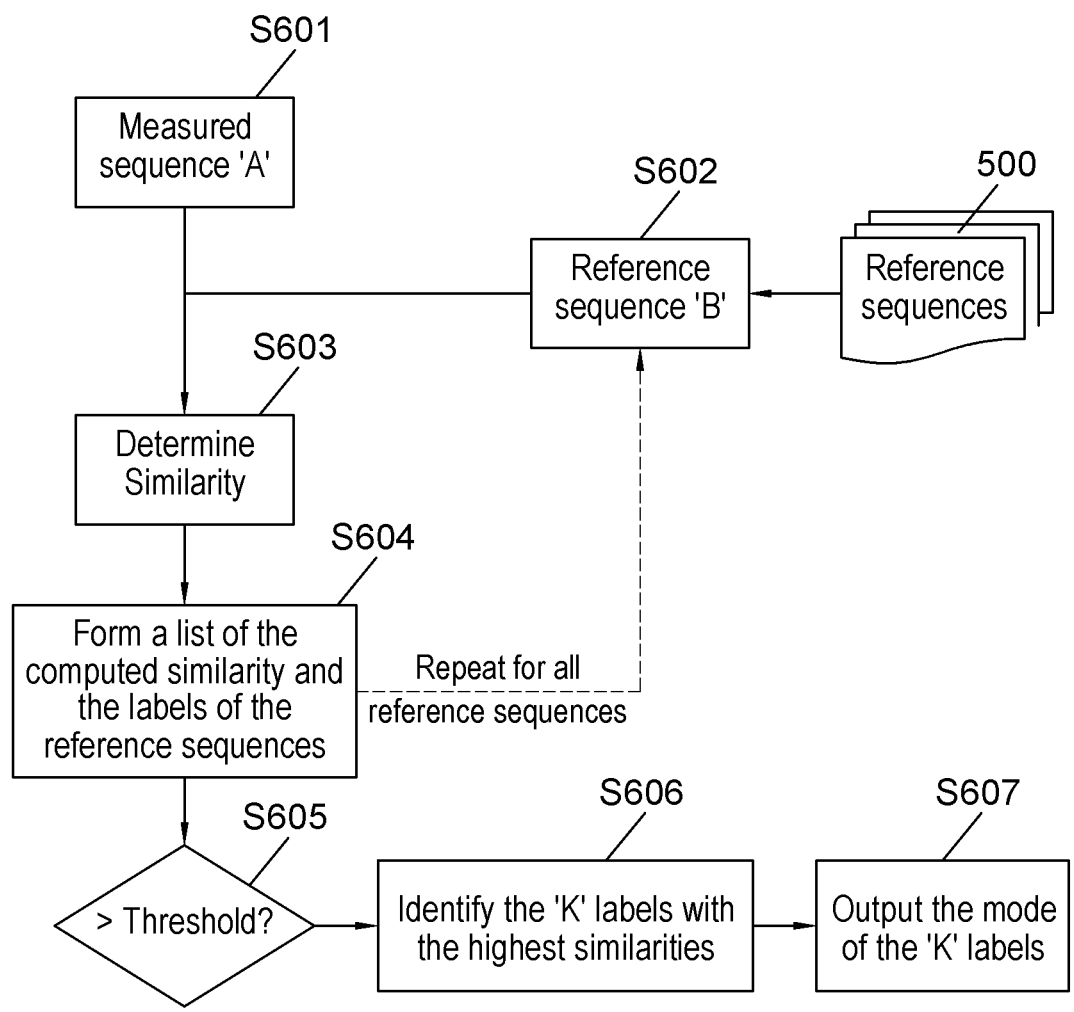
FIG. 6(c) shows a schematic illustration of a method of classifying a measured sequence by comparing it with various reference sequences used in a method in accordance with an embodiment.

FIG. 6(c) shows a schematic illustration of a method of K-Nearest Neighbour (K-NN) classification used in a method in accordance with an embodiment. In the K-NN classification algorithm, the 'K' classes that are most similar to the test signal are identified based on the similarity measures, and the class that appears most often in this set is output as the prediction. K is a positive integer and has a value of 1, 2, 3, 4, 5, 6, ... and so on. K may be selected as an odd value.

In Step S601, a measured sequence 'A' is taken as input, as has been described above. As described above, sequence A is a sequence of N-dimensional vectors, where each vector corresponds to a frame m and each dimension n corresponds to a sensor measurement. In step S602, a labelled reference sequence 'B' is obtained. The reference sequence B is obtained from a stored vocabulary of reference sequences 500. The stored vocabulary of reference sequence 500 comprises reference sequences and their corresponding labels, for example the word corresponding to the sign. The reference sequences in vocabulary 500 are sequences obtained by sampling time varying signals that correspond to the same sensors, measuring whilst the user performed the sign corresponding to the label. The reference sequences are also sequences of N-dimensional vectors, where each vector corresponds to a frame q and each dimension corresponds to the same sensor.

Optionally, the vocabulary 500 comprises at least K reference sequences having each label. Alternatively, when K is greater than one, any number of reference sequences per sign greater than or equal to two may be used. In this case, ensuring that all signs have the same number of reference sequences prevents a bias of classification towards signs with more samples. When K is greater than one, the K most similar classes will be identified, and it is required to have more than one reference sequence per sign in order to identify a mode as described below in relation to S606. When K is one, any number of samples can be used for any sign. The vocabulary 500 and how it is obtained is described further below in relation to FIG. 9.

In step S603, the similarity between test sequence A and reference sequence B is obtained using DTW. DTW will be explained in detail below. The output of this step is a single value, where a lower value represents a higher similarity between the sequences.

In step S604, the computed similarity and the label of reference sequence B is added to a list. Steps S602 to S604 are repeated until a list comprising the similarity of the measured sequence A with each reference sequence in the reference sequence vocabulary 500 is formed. The list formed in S604 is arranged in order of similarity.

Figure 8:
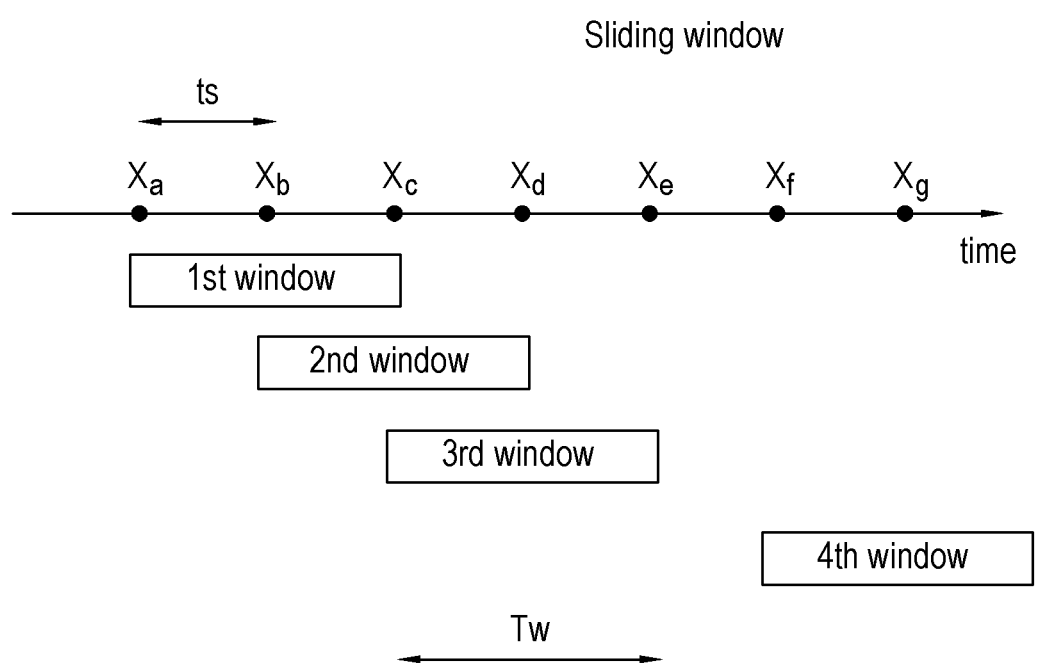
FIG. 8 shows a schematic illustration of a method of acquiring samples using a sliding window.

In Step S605, when the classifier operates using a sliding window as described in relation to FIG. 8, the value corresponding to the highest similarity (i.e. the lowest DTW output value) obtained is compared to a threshold value. Inclusion of this step reduces the likelihood of misclassification. The threshold value and its determination are described further below in relation to FIG. 9(c). If the value corresponding to the highest similarity meets the threshold criteria, then steps S606 and S607 are performed to output a prediction. For example, if the lowest similarity measure output from the DTW algorithm is less than or equal to the threshold value, then steps S606 and S607 are performed. If the value corresponding to the highest similarity does not meet the threshold criteria, then the sliding window is moved by a first increment as described in relation to FIG. 8.

When the classifier is used for single sign classification (without a sliding window) step 605 may also be included. In this case, if the value corresponding to the highest similarity does not meet the threshold criteria a message may be outputted to the operator indicating that the algorithm is unable to classify.

If a sign continues to give a failed message, the sign may be re-trained. The newly recorded samples then replace the old ones for that sign. Alternatively, the newly recorded samples are added to the stored vocabulary, provided that, if K>1, the stored signs all have the same number of reference sequences. When the number of samples is not equal, a method such as Dynamic Time Warping Barycenter Averaging which will be described below can be used to reduce the sample counts such that they are equal for example. Alternatively, the recording of equal numbers of reference samples by the user is enforced. Training will be described in relation to FIG. 9(b) below.

In Step S606, the K labels corresponding to the top K similarities are identified, and the label appearing most often in the K identified labels is returned as output, which represents a prediction of the class to which the test sequence belongs.

According to one embodiment, K=1. According to another embodiment, K=3. According to another embodiment, K=5. Increasing the value of K may improve the accuracy of classification. For example, using a value of K=3 or more is generally found to provide improved accuracy compared to using a value of K=1. However, using a larger value of K means that more reference samples are required to be stored, and that DTW must be performed for more reference samples during operation. It is found that using K=3 or K=5 provides a good balance of accuracy and speed of operation.

When the classifier operates using a sliding window as described in relation to FIG. 8, where K different labels are returned, then the sliding window is also moved by a first increment as described in relation to FIG. 8.

When the classifier is used for single sign classification (without a sliding window), where K different labels are returned, a message may also be outputted to the operator indicating that the algorithm is unable to classify. Alternatively, it is noted that in the single sign classification case, it is likely that the user desires an output even if the output may be incorrect, unless providing an incorrect output would be dangerous. Therefore, in a situation with no clear result, some form of "tie-break" style determination is used to choose a best classification. For example, if K=5 and two signs with two matches are obtained; K is decreased by 2 (to the next highest odd number less than K) so that K=3. With K reduced to K=3, two of the matches would correspond to one sign, and one of the matches would correspond to the other sign. In this example, the dominant sign (the sign with two matches out of the three) can then be determined. K can be further reduced until K=1 in order to determine the dominant sign.

Although in the above described method, a step of comparing the nearest neighbour similarity value to a threshold is included, alternatively step S605 may be omitted.

In the following, dynamic time warping will be described. Dynamic time warping between two one-dimensional sequences A and B will be described initially. It will then be described how the dynamic time warping method is modified to determine a measure of similarity between two sequences of N dimensional vectors. In the following, sequence A is referred to as the test sequence, and sequence B is referred to as the reference sequence. Sequence A comprises M elements, referred to by an index i, and sequence B comprises Q elements, referred to by an index j.

A M×Q matrix whose every element (i, j) is the distance between A(i) and B(j) may be constructed. Various distance measures may be used, such as Euclidean distance. Dynamic time warping aims to finding a path through such a matrix that minimizes the cumulative distance along the path. This path gives the optimal alignment between the two time series, and is referred to as the "optimal warp path". The sum of the distances along this path gives the measure of similarity of the two time series, where a lower value indicates a higher similarity. The warp path starts at the points (1, 1) and ends at the points (M,Q) of sequence A and B. The warp path W comprises a sequence of coordinates W={(1, 1), . . . (i, j), . . . (M, Q)}. The indices i and j must be monotonically increasing in the warp path, and every index of each time series must be used. The length of the optimal warp path, i.e. the sum of the distances between the elements along the warp path, is the DTW distance.

One method for determining the warp path uses the following approach, which is also illustrated in FIG. 6(a). A cost matrix D of dimensionality M×Q is formed. Starting from i=j=1 and iterating through each element (i, j) of matrix D in turn one column at a time, from the bottom up (increasing j) and then from left to right (increasing i), the following steps are performed:

1. compute a distance between the $i^{th}$ element of A and the $j^{th}$ element of B, represented by dist[A(i), B(j)];
2. determine min[D(i−1, j), D(i−1, j−1), D(i, j−1)], where the smallest value out of the element of D in the previous column and previous row, D(i−1, j−1), or the element of D in the previous column and present row, D(i−1, j); or the element of D in the previous row and present column, D(i, j−1), is selected; and
3. add the above two values to obtain the value of the present element of the cost matrix as D(i, j)=dist[A(i), B(j)]+min[D(i−1, j), D(i−1, j−1), D(i, j−1)].

The distance calculated in step 1 may be the absolute distance given by |A(i)−B(j)|. Other distance measures may be used, for example the squared distance.

FIG. 6(a) shows a schematic illustration of a cost matrix D. After the matrix is completed, the warp path may be found. Finding the warp path refers to determining the coordinates (i,j) of each point along the warp path. The warp path is obtained by starting at D(M, Q), performing a greedy search that evaluates the cells to the left, down, and diagonally to the bottom left, and adding whichever cell has the smallest value to the warp path W. The search looks for the minimum of [D(i−1, j), D(i−1, j−1), D(i, j−1)], where the smallest value out of the element of D in the previous column and previous row, D(i−1, j−1), or the element of D in the previous column and present row, D(i−1, j); or the element of D in the previous row and present column, D(i, j−1), is selected. The greedy search is repeated from that cell until the D(1,1) is reached. The warp path, W, is indicated by the shaded cells in the figure.

The similarity between the two temporal sequences A and B is obtained as the value of the cost matrix D in cell (M, Q). This corresponds to summing the distances between the elements along the warp path. The lower the value of D(M,Q), the more similar the sequences A and B are. FIG. 6(b) shows a schematic illustration of the correspondence between the points in the two sequences along the warp path.

In the DTW algorithm described above, the value of M×Q elements of the cost matrix D have to be computed. An implementation of DTW using an algorithm that computes fewer than the M×Q elements of matrix D can be used to more efficiently determine a similarity between two temporal sequences A and B. An example of such an algorithm is the FastDTW algorithm. The FastDTW algorithm comprises the following steps:

i. Define a minimum sequence length $s_{min}$ and a radius r that represents the distance to search around the projected warp path.

ii. Repeatedly shrink the temporal sequences A and B by the same amount until the length of A or the length of B is less than $s_{min}$. In an example, sequences A and B are shrunk by reducing their lengths by a factor of 2 each time. Shrinking in this case is performed by averaging adjacent pairs of points; for example, the first element of the shrunk sequence of A is the average of A(1) and A(2), the second element of the shrunk sequence of A is the average of A(3) and A(4), and so on.

iii. Once the length of shrunk sequences is less than $s_{min}$, DTW is performed on the shrunk sequences as described above in steps 1 to 3, and the warp path is determined. A low resolution warp path w(i', j') is obtained by generating the cost matrix following steps 1 to 3 above, and obtaining the warp path by starting at D(M', Q'), performing a greedy search that evaluates the cells to the left, down, and diagonally to the bottom left, and adding whichever cell has the smallest value to the warp path W. The greedy search is repeated from that cell until the D(1,1) is reached. A list of the coordinates (i, j) of the cells in the warp path is produced from this step.

iv. The low resolution warping path w(i', j') is then projected onto a higher resolution matrix. The resolution is increased by doubling the number of elements in each sequence forming the cost matrix. Each element in each of the shrunk sequence is mapped to two adjacent elements in the higher resolution sequence. Thus, a single point of w(i', j') will map to at least four points at the higher resolution warping path.

v. Values of the elements within the radius of the warp path in the higher resolution cost matrix are re-computed as described in steps 1 to 3 above. Points greater than a distance r from the warping path retain the low resolution values.

vi. A higher resolution warping path is determined, in the same manner as described in step iii above.

vii. Steps iv to vi are then repeated using the higher resolution warping path as a starting point, until the original resolution of the sequences is reached.

viii. Once the original resolution of the sequences is reached, the similarity between the sequences is obtained as the value of the highest resolution cost matrix D in cell (M, Q).

In the FastDTW implementation, fewer elements of the cost matrix are required to be calculated. The number of cells of the cost matrix that have to be filled is 2M×(4r+3), when M≈Q. An example of a FastDTW algorithm is provided in Salvador, S and Chan, P, "FastDTW: Toward accurate dynamic time warping in linear time and space." Intelligent Data Analysis 11.5 (2007): 561-580, which is incorporated herein by reference.

Alternatively, the DTW algorithm can be approximated by using a PrunedDTW algorithm. An example of a PrunedDTW is provided in Silva, D. F. and Batista, G. E., 2016, June "Speeding up all-pairwise dynamic time warping matrix calculation" In Proceedings of the 2016 SIAM International Conference on Data Mining (pp. 837-845). Society for Industrial and Applied Mathematics, which is incorporated herein by reference.

Alternatively, the DTW algorithm described above can be approximated by using a SparseDTW algorithm. An example of a SparseDTW algorithm is provided in Al-Naymat, G., Chawla, S. and Taheri, J., 2009, December "Sparsedtw: A novel approach to speed up dynamic time warping" In Proceedings of the Eighth Australasian Data Mining Conference-Volume 101 (pp. 117-127). Australian Computer Society, Inc, which is incorporated herein by reference.

Alternatively, the DTW calculations described above can also be ended early if a bound on distance is met. A bound may be met when the distance computed for the DTW is above a threshold. A bound may additionally or alternatively be met when the distance computed for the DTW is longer than the distance for any K reference samples already computed. Additionally or alternatively, a bound may be determined using an algorithm such as the example provided in Keogh, E., 2002. Exact indexing of dynamic time warping, Proceedings of 28th International Conference on Very Large Data Bases, Hong Kong, China, which is incorporated herein by reference.

Figure 7:
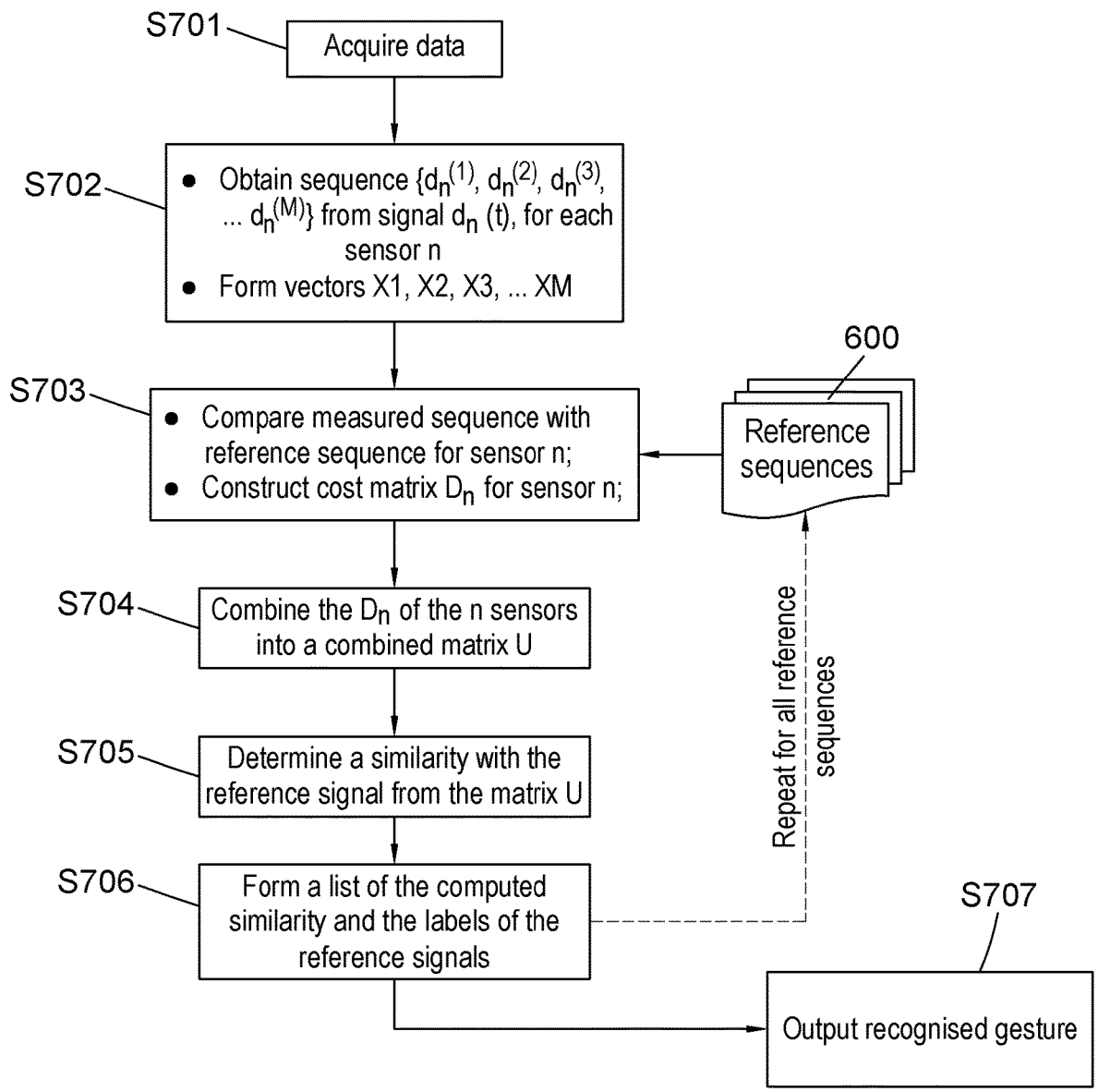
FIG. 7 shows a schematic illustration of a method of classifying a gesture in accordance with an embodiment.

The above description provides an example method of implementing DTW to determine a similarity measure between two one-dimensional sequences. In the method described in relation to FIG. 7 below, a DTW based approach is used to determine a similarity measure between two N-dimensional sequences, where N is greater than 1. FIG. 7 shows a flowchart illustrating a method for recognising a gesture in accordance with an embodiment.

Figure 5A:
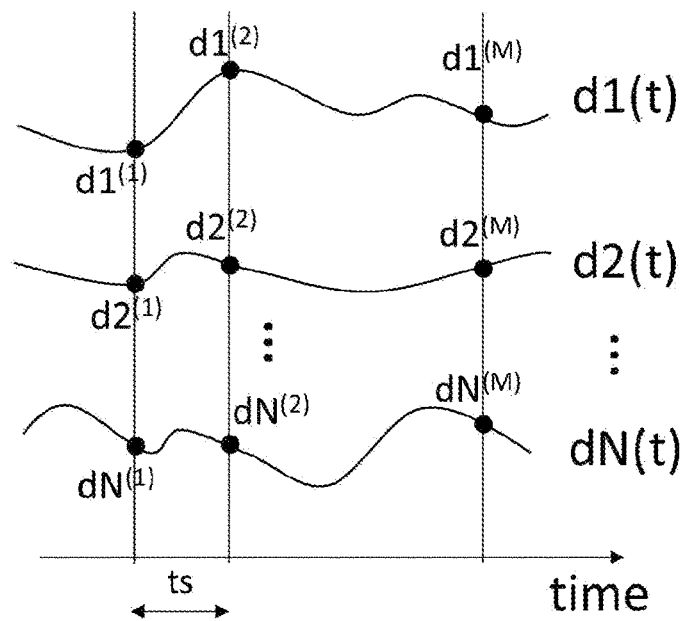
FIG. 5(a) shows a schematic illustration of signals output by the sensors of a system for gesture recognition in accordance with an embodiment.
Figure 5B:
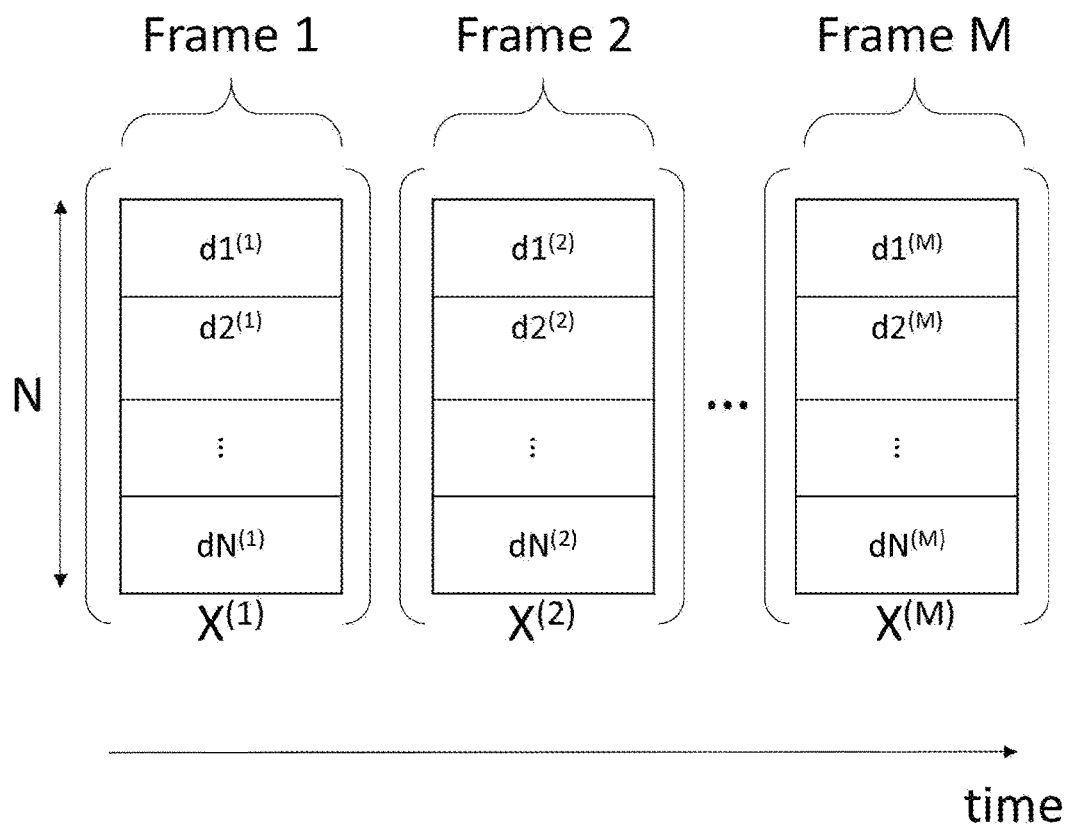
FIG. 5(b) shows a schematic illustration of the sequence of vectors formed from the output signals.

In step S701, for each sensor n, a sequence $\{d_n^{(1)}, d_n^{(2)}, d_n^{(3)}, d_n^{(M)}\}$ is obtained by taking samples from the time varying signal $d_n(t)$ as described in relation to FIG. 5(a). Here, $d_n^{(m)}$ represents the $m^{th}$ measured data point, where m=1, 2, 3, . . . M, for a sensor n. In step S702, the measured data acquired from the N sensors of the glove is represented by M frames. Each frame is represented by a vector X(m), where m=1, 2, 3, . . . , M, and where $X^{(m)}$ comprises N elements as described in relation to FIG. 5(b).

In step S703, the input measured sequence of N-dimensional vectors is compared to a reference sequence of N-dimensional vectors from a vocabulary of stored reference sequences 600. Each reference sequence has a corresponding label denoting a sign. For each sign, the vocabulary 600 may further comprise a corresponding audio file. The vocabulary 600 comprises at least K reference sequences per sign.

The reference sequence values are represented by $r_n^{(q)}$, which represents the $q^{th}$ measured data point, where q=1, 2, 3, ... Q, for a sensor n, where Q is the number of frames in the reference sequence. Each reference sequence comprises a sequence of N-dimensional vectors. Each reference sequence may be the same length, or a different length. For simplicity, in the below, it is assumed each reference sequence is the same length Q. It is noted that Q and M may be different.

In step S704, a DTW method is performed to determine a similarity measure. DTW has been described above for determination of a similarity value between two one-dimensional sequences. Here, the DTW is used to measure the similarity of two sequences of N-dimensional vectors. The DTW approach is therefore modified in order to take account of the N dimensions. In the modified approach, the distance between an element of the measured sequence and an element of the reference sequence is calculated as a distance between the two N-dimensional vectors. For example, a Euclidean distance between the two N-dimensional vectors is calculated. This is referred to as the DTW-dependent ($DTW_d$) approach. In a $DTW_d$ approach the calculation of the warping path is dependent on the distances between the N-dimensional vectors. This is different from a DTW-independent ($DTW_i$) approach where each of the N dimensions of the N-dimensional vectors are treated independently such that N independent warping paths are calculated and a combined distance is obtained by summing.

In one approach, a cost matrix D of dimensionality M×Q is formed. It is noted that it is possible to get slightly different distance results when the horizontal and vertical sequences are swapped due to the approximations in the DTW algorithms. However generally, it is expected that the differences between signs are much greater than the differences due to this approximation. Therefore the order used in the method is arbitrary. Starting from m=q=1 and iterating through each element (m, q) of matrix D in turn, for example, from the bottom up (increasing q) and then from left to right (increasing m), the following steps are performed:

I. compute a distance between the $m^{th}$ element of A and the $q^{th}$ element of B, represented by dist[A(m), B(q)];

II. determine min[D(m−1, q), D(m−1, q−1), D(m, q−1)], where the smallest value out of the element of D in the previous column and previous row, D(m−1, q−1), or the element of D in the previous column and present row, D(m−1, q); or the element of D in the previous row and present column, D(m, q−1), is selected; and III. add the above two values to obtain the value of the present element of the distance matrix as D(m, q)=dist[A(m), B(q)]+min[D(m−1, q), D(m−1, q−1), D(m, q−1)].

In step I, the distance is calculated as a distance between the two vectors corresponding to the mth element of the measured sequence and the qth element of the reference sequence. The distance function dist is obtained as dist[$X^{(m)}$, $Y^{(q)}$], where $X^{(m)}$ comprises $d_1^{(m)}$, $d_2^{(m)}$, $d_3^{(m)}$, $d_N^{(m)}$, and where $Y^{(q)}$ comprises $r_1^{(q)}$, $r_2^{(q)}$, $r_3^{(q)}$, ... $r_N^{(q)}$. "q" represents the frame number of a reference sequence and q=1, 2, 3, ... Q. The distance dist[$X^m$, $Y^q$] may be calculated as the Euclidean distance between the two vectors, and is given by $\sqrt{\Sigma_{n=1}^N (d_n^m - r_n^q)^2}$. The distance dist[$X^m$, $Y^q$] may alternatively be calculated as the cumulative squared Euclidean distance, given by $\Sigma_{n=1}^N |d_n^{(m)} - r_n^{(q)}|^2$.

An efficient implementation for calculating the similarity measure based on steps i to viii described above, and modified to take into account the multiple dimensions, may be used to calculate the similarity measure without requiring calculation of the entire cost matrix. In particular, steps i to viii above are performed, wherein in step iii the distance measures used to determine the cost matrix are calculated as a distance between two vectors, as described in step I above. For example, the distance dist[$X^{m'}$, $Y^q$] may be calculated as the Euclidean distance between the two vectors, and is given by $\sqrt{\Sigma_{n-1}^N (d_n^m - r_n^q)^2}$. Similarly, in step vi, the distance measures used to determine the cost matrix are calculated as a distance between two vectors, as described in step I above. In step ii, shrinking is performed by averaging each of the corresponding elements of the vectors corresponding to adjacent pairs of points.

In step S705, a similarity value is obtained from the combined cost matrix. The similarity between the two temporal sequences of N-dimensional vectors is obtained as the value of the cost matrix D in cell (M, Q). The lower the value of D (M,Q), the more similar the sequences are.

The value of the radius r used to perform the DTW may be selected for good performance. A larger radius value will result in an increase in the number of calculations it is required to perform. However, setting the radius value too small may mean that the optimal warp path is missed. In an embodiment, the radius r is set to a number corresponding to half the acquisition duration size $T_A$, so that r=(1/ts)×$T_A$/2. For example, where the frame rate (1/ts) is 60 Hz and the window $T_A$ is 2 seconds, the radius r=60 (corresponding to 1 second).

Optionally the DTW distance value D(M, Q) is normalised to take into account the length of the reference sequences. For example, the normalised DTW distance is obtained as {1 max(M,Q)}×D(M, Q), where max(M,Q) is the maximum of M or Q. In another example, the normalised DTW distance is obtained as {1/(min(M, Q)}×D(M, Q), where min(M,Q) is the minimum of M or Q. In a further example, the normalised DTW distance is obtained as {1/(mean(M, Q)}×D(M, Q), where mean(M,Q) is an arithmetic or geometric mean of M or Q This reduces the impact of the length of the reference sequence on the similarity values. Shorter sequences will generally result in lower output values, i.e. higher similarity measures.

In step S706, a list of the computed similarity values and the labels of the reference sequences is formed in the same manner as described in S604 of FIG. 6(c). Steps S703 to S705 are repeated until a list comprising the similarity values with all the reference sequences in the vocabulary 600 and their labels is formed. In steps S707, a label is selected from the stored vocabulary using the similarity measures. The gesture is determined in the same manner as described in relation to steps S605 to S607 of FIG. 6(c).

The above description considers a case where the user manually begins the classification process for each sign by, for example, pushing a button. In the above method, the classifier waits until the end of the sign before being applied to the entire duration of the sign. Alternatively however, classification may be carried out continuously on a sliding window over the incoming data. FIG. 8 shows a schematic illustration of a method of continuous gesture recognition in accordance with an embodiment using a sliding window. The method of FIG. 7 may be adapted for continuous classification in the following manner:

(i) The system acquires a sequence of input frames for a duration Tw. The number of frames acquired, M, is the product of the frame rate (1/ts) and the window size Tw. In the example shown in FIG. 8, M=3 and, in the first window, input vectors $X_a$, $X_b$ and $X_c$ are obtained from the sensor values. The input vectors correspond to the vectors X described in relation to FIG. 5(b) for example. Although a small number of frames is shown here for illustration, in practice, the total number of frames may be of the order of 1000 frames when the frame rate is 60 Hz and signs are being acquired for a duration of 10 or more seconds.

(ii) Steps S703 to S707 of FIG. 7 are carried out, once the first sequence of M frames has been acquired.

(iii) If no corresponding sign is found, the sliding window is moved by a first increment, and a further input vector or vectors (depending on the size of the increment) are appended to the sequence of first vectors, whereas the same number of vectors from the start of the sequence are discarded. For example, in FIG. 8, the window is moved on by one frame at a time, thus with each step a vector from the start of the window is discarded and a vector is added to the end of the window.

If a corresponding sign is found, the memory buffer containing the sequence of M vectors is cleared. The window is essentially moved by a second time increment corresponding to the window size.

Whether a sign is found or not may be determined as described in relation so step S606 of FIG. 6(c). For example, no corresponding sign may be found where the value corresponding to a highest similarity does not meet a threshold criteria. For example, the lowest DTW value for the reference signs is greater than a threshold value.

(iv) Steps (i) to (iii) are repeated.

A window size of 2 seconds has been found to provide good performance.

Optionally, when the measured sequence is compared to each reference sample using dynamic time warping, if the measured sequence is longer than the reference sample, only part of the measured sequence is used for the comparison. Thus for each reference time sample, the measured sequence length is compared to the reference sample length. If the reference sample length is longer than the measured sequence length, the full measured sequence is compared to the reference sequence. If the measured sequences is longer than the reference sample length, a part of the measured sequence only is compared to the reference sequence. The part of the measured sequence may comprise a part from the beginning of the measured sequence to a point in the measured sequence corresponding to the length of the reference sequence plus an additional margin. The additional margin may be 10% of the reference sequence length. In this manner, the length of the measured sequence used for comparison is set so as to allow to compare the whole of a sign against the reference samples, but not to include more than one sign within the window. In this manner, an effective window size for comparison which is the smallest of the pre-selected window size and the reference sample length (plus some margin) may be selected each time the DTW is performed. This reduces the likelihood of having a large number of one-to-many mappings (from the measured sequence to the reference sequence) at the end of the warp path, which can increase the value of the DTW distance. For example, when the reference sign is substantially shorter than the window length, even if the samples of the measured sequence obtained at the start of the window match the reference sequence, a large number of points in the measured sequence (after the part that matches the reference sequence) will be warped to the last point in the reference sample, which result in a larger DTW distance than is reasonable. By cropping the end of the measured sequence in such cases, the impact of such effects is reduced. In this way, the effective window length used for each comparison is less than or equal to the reference sample length.

Optionally and additionally, the values of the distances between an input sequence X and a reference sequence Y are weighted so that for the first and last few points of the sequence (that is, when m and p are close to zero, or when m and p are close to M and Q respectively), the distances are lower. The distance here refers to the distance (for example Euclidean distance) between $X^{(m)}$ and $Y^{(q)}$ which is used to compute the DTW distance measure between the two sequences (by summing the Euclidean distances along the warp path). At the beginning and end of the input sequence and reference sequence, $X^{(m)}$ and $Y^{(q)}$ may be different if the input sequence entered by the user does not start immediately or ends earlier relative to the reference sequence. These differences would add to the DTW distance measure between the two sequences. By applying a weighting function as above, the DTW distance measure is less sensitive to differences between $X^{(m)}$ and $X^{(q)}$ at the beginning and end of the sequences. For example, the distance between X and Y is linearly weighted such that the weighted distances are inversely proportional to the value of m from the middle of the sequence. Alternatively, the Euclidean distance between X and Y is weighted using a Gaussian distribution such that weighted distances near the middle of the sequence are larger, while weighted distances near m=0 or m=M are smaller.

In the embodiment illustrated in FIG. 8, the window is moved by one frame at a time, such that: in the first acquisition window, first vectors Xa, Xb and Xc are taken but no match is found; in the second acquisition window, first vector Xd is added to the sequence of first vectors whilst vector Xa is discarded, but no match is found; in the third acquisition window, first vector Xe is added to the sequence of first vectors while vector Xb is discarded and a match is found, the fourth window therefore comprises vectors Xf, Xg and Xh. When a vector is added to an existing sequence, the oldest vector is deleted. For example, as shown in FIG. 8, in the second acquisition window, when vector Xd is acquired, vector Xa is removed from the buffer. The length of the input sequences are limited to M measurements as described in relation to FIGS. 5 (a) and (b) for example.

The increment by which the window is moved on may be selected for good performance. Using a smaller increment (for example 1 frame) may provide improved accuracy of classification. However, using a smaller increment increases the time required to process the incoming data. A larger increment may therefore be selected when processing resources are constrained. For example, the increment may be selected as 2 or more frames.

Alternatively, the sliding window may be moved by a third increment. The third increment may be equal to the window duration Tw for example. When a predetermined hand configuration (e.g. clenching the hand) that indicates the start of signing is detected, the sliding window and classification operates as described in relation to FIG. 8 above. In this case, a separate sliding window style classifier is used to identify a moving gesture to start the classification described above.

FIG. 9 (a) shows a flowchart illustrating a method of calibrating a system such as that described in FIG. 1 or 2. When the user first uses the glove, prior to any training/recording of signs, a calibration sequence is performed where the user is requested to wear the glove device and perform gestures designed to maximally exercise the sensors in the glove. For example, the user is requested to scrunch their fingers, flex their fingers, rotate the hand in all orientations possible. For each sensor n, the maximum ($max_n$) and minimum values ($min_n$) of the sensor output obtained during the calibration sequence is determined. The maximum ($max_n$) and minimum values ($min_n$) of the sensor output are compared to previously stored maximum and minimum values in memory. The initial stored maximum and minimum values may be values obtained from, for example, the sensor manufacturer datasheets. If the maximum value ($max_n$) is greater than the previously stored value, the value of $max_n$ stored in memory is updated. If the minimum value ($min_n$) is less than the previously stored value, the value of $min_n$ stored in memory is updated. During use of the device for classification, these values are used to normalise the sensor values as has been described above.

FIG. 9 (b) shows a flowchart illustrating an example method for training a system such as that described in FIG. 1 or 2, and for forming the vocabulary of reference sequences used in the methods described above. The system may be trained by recording reference samples corresponding to gestures performed by the intended user of the device. In such systems, "personal" classifiers are trained to recognise custom dynamic hand gestures. Personal classifiers may produce more accurate results than general classifiers due to individual differences in hand movements and motor abilities. Recognising custom hand gestures widens the application of using the system beyond the sign language community. For example, recognising custom hand gestures may allow include individuals who do not use a standard library of sign language due to their personal disabilities and physical limitations of hand movement, such as those seen in stroke victims and in those with other neural disorders, to use the system.

In step S801, a request for a training sample is output to the user. For example, a request for a sample corresponding to a specific sign may be displayed on the device by displaying the word corresponding to the sign. Alternatively, the operator selects a label from a list, or. For example, during the training stage, the screen shows a list of words with a user interface menu for the user to scroll through them. For example, a list of ten words may be shown. For example, the 10 words may be: 'Yes', 'No', 'Stop', 'Help', 'Please', 'Thank You', 'More', 'Cake', 'Toilet', 'Food'. Alternatively, the operator inputs a new label corresponding to their own signs using the input means 7. Alternatively, a list of words is available and the operator also inputs new labels using the input means 7.

When the output means is a speaker, an audio file corresponding to each existing label is also provided in the vocabulary. When the output means is a speaker, and the operator inputs a new label, the operator may also provide an audio file that corresponds to the new label. A label could be either a string of text, a number or other reference either assigned by the user or automatically assigned by the system if no user-facing label is appropriate. The audio file may be retrieved from a cloud based system after training is completed for example. Alternatively, the audio file may be retrieved from a cloud based text-to-speech system at classification time. The audio file may be in any language.

In Step S802, the operator then performs the gesture corresponding to the sign. Data points from each sensor are acquired as described for S102 of FIG. 4. The data points may be acquired at the same frame rate as is used during operation of the device, when signs are to be classified. Alternatively, a different frame rate may be used during the calibration stage, and the reference sample or measured sample are then adjusted to the same frame rate before the DTW step is performed. For example, the reference samples may be recorded at a higher frame rate, to provide increased flexibility in the frame rate that can be used for measurement.

In Step S803, the measured data points from each of the sensors are combined into a sequence of vectors forming the reference sequence. Each vector in the reference sequence comprises a value from each sensor. The reference vectors included in the sequence comprise measured data acquired from the N sensors of the glove. The reference vectors are represented $Y^{(1)}, Y^{(2)}, Y^{(3)}, \ldots$, which comprise the same elements as input vectors X described in relation to FIG. 5(b). The vectors $Y^{(1)}, Y^{(2)}, Y^{(3)}, \ldots$ represent frames.

In Step S804, the operator provides an input to indicate that he has completed his gesture. The reference sequence of input vectors formed in S803 $Y^{(1)}, Y^{(2)}, Y^{(3)}, \ldots Y^{(Q)}$ is then stored. The number of frames acquired is represented by 'Q'. Q is given by a training time, $T_T$, multiplied by the frame rate (1/t2). The training time $T_T$ is the duration between the operator triggering the measurement in S802 and indicating the end of measurement in S804. The frame rate (1/t2) used in training may be equal to the frame rate (1/ts) used for classification.

In step S805, the length of the reference sample is stored. The length, i.e. number of frames, of each recorded reference sample is stored. As has been described above, when using a sliding window, the length of the measured sample may be compared to the length of the reference sample, and if the measured sample is longer than the reference sample, the measured sample is cropped to the length of the reference sample (plus some margin). In this step, the maximum possible window length is stored for each reference sample, i.e. the window length used for the DTW with the reference sample is less than or equal to the reference sample length When training, ideally the recorded samples have as little padding at the start and the end as possible that doesn't actually correspond to the sign.

In step S806, the operator provides a further input to confirm that the gesture performed is to be saved. Once confirmation is obtained, the reference sequence $Y^{(1)}, Y^{(2)}, Y^{(3)}, \ldots Y^{(Q)}$ is saved to the vocabulary 500, 600.

The user is requested to record K or more samples corresponding to each sign in the vocabulary. Where K=1, a single sample may be recorded for each sign in the vocabulary.

Optionally, once all of the reference samples are recorded, the values are normalised. Normalisation is carried out using the following operation: $(r_n-min_n)/(max_n-min_n)$, where $r_n$ is a value from sensor n for example. Alternatively, a normalisation that is similar to the previous example except that any values of $r_n$ outside the calibraton range between $max_n$ and $min_n$ are clamped to $max_n$ or $min_n$. Alternatively, other normalisations that treat outliers differently could be used.

The sequence of reference vectors formed in S803 $Y^{(1)}, Y^{(2)}, Y^{(3)}, \ldots Y^{(Q)}$ is then saved in the vocabulary 600, together with the label selected or defined by the user in step S801. If the operator does not provide a further input to confirm in S806, the sequence is not saved and the glove returns to step S801.

Once the reference sequences are recorded, further steps may be performed to determine a threshold value to be used in S605 of FIG. 6 (c). A test sequence is selected from the vocabulary of reference sequences and the similarity of the test sequence with each of the other reference sequences is determined using steps S703 to S705 described in FIG. 7. The determined value of similarity varies depending on which reference sequence the test sequence is compared with. This is illustrated in FIG. 9 (c). The data from an arbitrary sensor is the dark line. The reference sample used in this case was a sine wave which is being passed along the sensor data in a sliding window. The distance line in lighter shading represents the distance for a window starting at that point. The distance hits a minimum exactly at the start of the shaded window, which corresponds to the actual performed sign in the data. The threshold may be calculated to cross at or near to that point and none higher (or at least one in the very close vicinity to that point). For reference sequences corresponding to the same sign, smaller DTW values are obtained. A threshold value that differentiates between the reference sequences corresponding to the same sign and the reference sequences corresponding to different signs is selected. For example, a threshold value that lies between the maximum DTW similarity measure for a corresponding sign and the minimum similarity measure for a different sign is taken. The threshold value is saved and used in the method described in relation to FIG. 7 to determine when no classification is found.

Optionally, a larger number of reference sequences may be obtained for each sign, and reference sequences may then be combined to form the final set of stored reference sequences. In this case, Steps S803 to S805 are repeated an additional number of times, so that additional reference sequences for each sign are obtained. Two or more reference sequences corresponding to the same sign are then combined into a single reference sequence. For example, 6 reference sequences may be obtained for one sign. Pairs of reference sequences are then combined, so that 3 final reference sequences result. Alternatively, one extra sequence is averaged with another, to give 5 reference sequences. These are stored as the final reference sequences for the sign. More than 2 reference sequences may be combined to form a single final reference sequence. The number of reference sequences may be combined to form K final reference sequences. Using a sequence that is the result of a combination of other reference sequences in further combinations may be avoided.

Figure 9A:
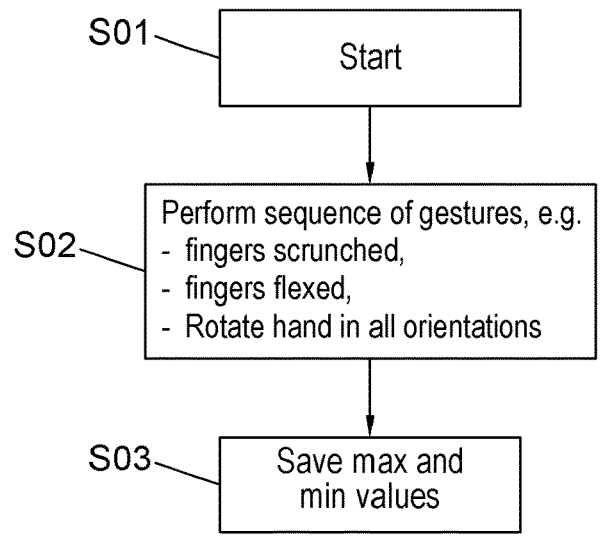
FIG. 9(a) shows a schematic illustration of a method of calibrating a system for gesture recognition in accordance with an embodiment.
Figure 9B:
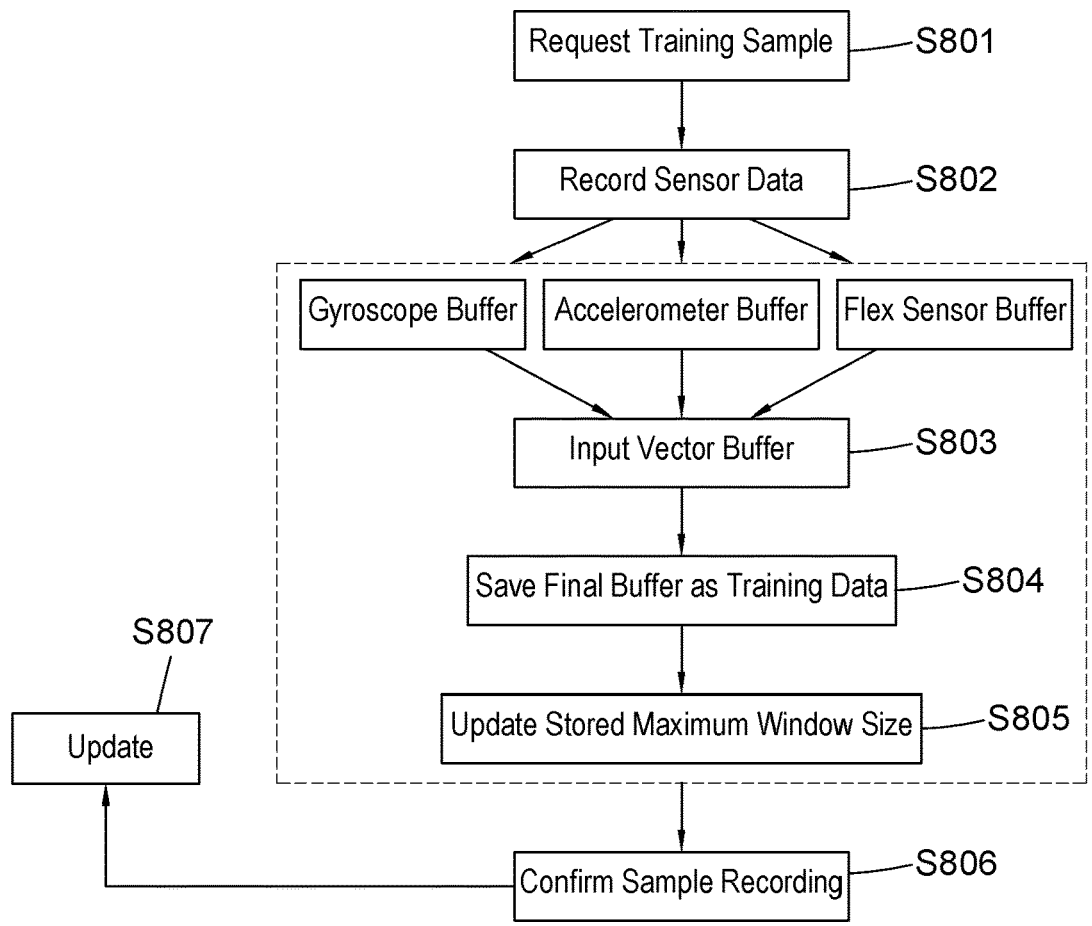
FIG. 9(b) shows a schematic illustration of a method of training a system for gesture recognition in accordance with an embodiment.
Figure 9C:
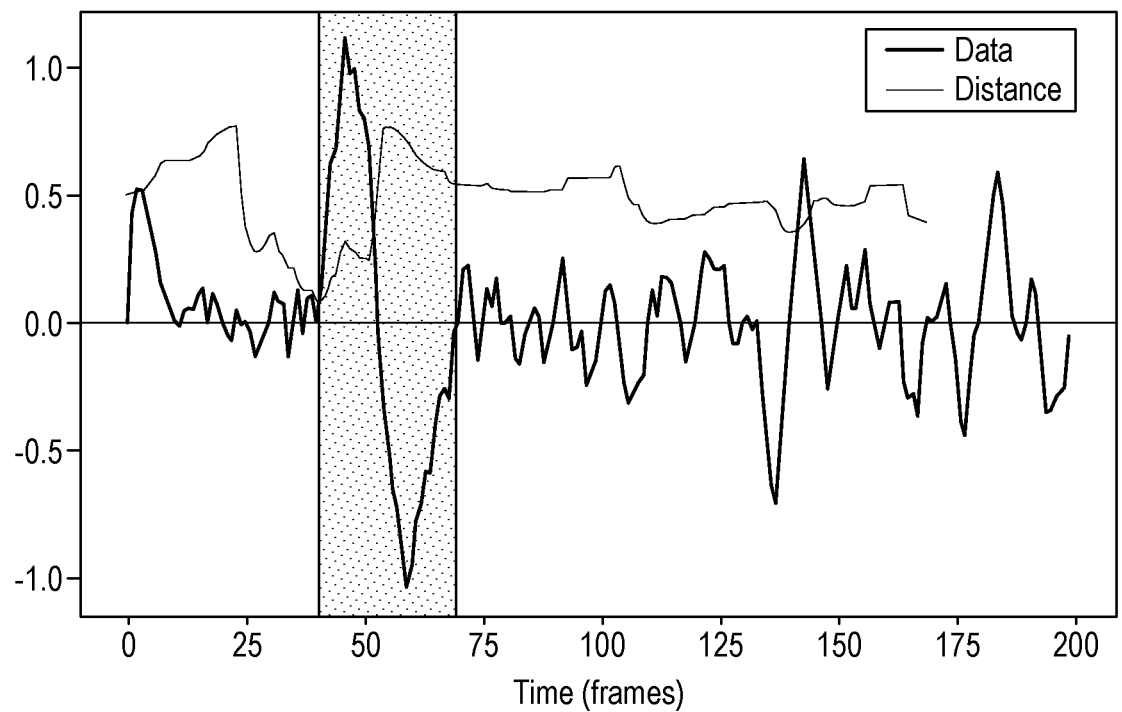
FIG. 9(c) shows a schematic illustration of a method for determining a threshold value for use in a method of gesture recognition in accordance with an embodiment.
Figure 9D:
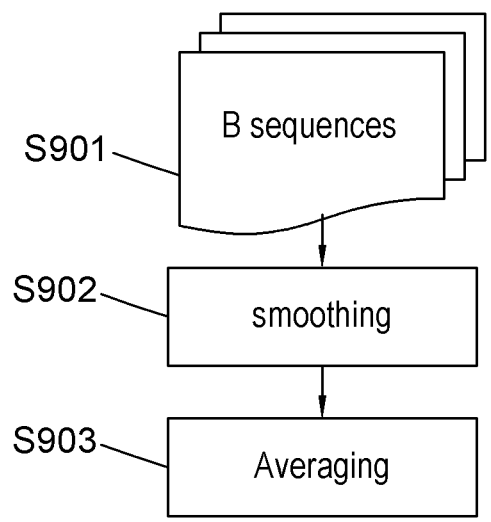
FIG. 9(d) shows a schematic illustration of a method of generating reference sequences to be used in a method of gesture recognition in accordance with an embodiment.

FIG. 9(d) is a schematic illustration of a method of combining B reference sequences into a single reference sequence. In step S901, the B sequences are obtained. In step S902, a smoothing filter is applied to each of the B sequences. For each of the N sensors, a sequence $\{r_n^{(1)}, r_n^{(2)}, r_n^{(3)}, r_n^{(Q)}\}$ is obtained for each of the B samples. The sequence $\{r_n^{(1)}, r_n^{(2)}, r_n^{(3)}, r_n^{(Q)}\}$ is filtered by convolving with a Gaussian filter function g. The Gaussian filter function is defined as $g[s]=1\sqrt{(2\pi)}\times1/\sigma\times\exp(-s^2/2/\sigma^2)$. The sequences from each sensor are filtered in a similar manner, for each sequence B. For each sample B, a sequence of n-dimensional vectors $Y'_1, Y'_2, \ldots Y'_Q$ are formed from the filtered sequences $\{r_n^{(1)}, r_n^{(2)}, r_n^{(3)}, r_n^{(Q)}\}$ for each sensor n. The Gaussian window function has a width $w_g$ and $w_g$ is between $3\sigma$ and $4\sigma$ to provide a smooth roll-off at 0 at the ends of the filter. The value of $\sigma$ depends on the sample rate. In an example, when the sample rate is 60 Hz a is between 3 and 5 frames.

In step S903, the B smoothed sequences are then combined using a Dynamic Time Warping Barycenter Averaging algorithm, denoted DBA.

The DBA algorithm comprises the following steps:
(i) An initial averaged sequence T of the set of B sequences is determined using the medoid of the set of B sequences, where the medoid is the sequence from the set of B sequences that has the minimum sum-of-squares distance from all the other sequences in the set of B sequences. The distance between two series is obtained using, for example, the DTW algorithm as has been described previously.
(ii) For each sequence in set B, the DTW cost matrix and the warp path between the sequence and the averaged sequence T is determined. The DTW cost matrix is obtained using an implementation such as the one described in relation to FIG. 5(a). The warp path is determined using the approach described in relation to FIG. 5(b). For each sequence, a set, termed alignment, is formed where alignment comprises the values of the sequence at the coordinates of the optimal warp path.
(iii) The alignments for each sequence in B are concatenated into a combined alignment for all the sequences in B.
(iv) Each element of the sequence T is updated with the arithmetic mean of the corresponding alignment from the combined alignment. The averaged sequence T is thus updated.
(v) Steps (ii) to (iv) are repeated a number of times, represented by iter, where iter is determined empirically. For example, iter=1000. The most up-to-date averaged sequence T is returned as the Barycentre average of the set of B sequences.

The DBA algorithm returns an averaged sequence, T, for an input of B sequences. The averaged sequence T is an average of the B sequences. The B sequences may include all the sequences corresponding to a label. Alternatively, the B sequences may include only some of the sequences corresponding to a label. In the latter case, more than one averaged sequence is obtained for the label. It may be chosen to either average all of the reference sequences for a label, or instead average them in pairs or threes, so that multiple averaged sequences are obtained. For example, for reference sequences labelled U, V, W, X. Y and Z, DBA may be performed on U and V together, as well as W and X together and Y and Z together such that three outputs are obtained, DBA(U,V), DBA(W,X) and DBA(Y,Z). Alternatively, DBA is performed on all of the sequences, giving one output i.e. DBA(U, V, W, X, Y, Z).

Alternatively, in step S903, when two sequences (B=2) are to be averaged, the warp path between the two is calculated as described previously. The averaged sequence can be formed by combining the two reference sequences according to their warp path, so that the position of a point in the combined sequence corresponds to the halfway point between the two points of the reference sequences, and the value of the combined sequence at that point is the average of the values of the reference sequences at their respective points. Referring to the warp path shown in FIG. 6(a) as an example, from the warp path coordinate of (i=2,j=3), a new position in the combined sequence of 2.5 is obtained. The new value at that position is the mean of A(2) and B(3). This is repeated for all points on the warp path. The list of new position and new values is resampled as appropriate so that the length of the average sequence has the same length as the reference sequence. For example resampling comprises discarding points for which more than one value is present at the same position. Optionally and additionally, resampling comprises moving the points to integer positions; for example, a new point at position 2.5 may be moved to position 3. The sequence thus returned is the average sequence T. This method of obtaining an average sequence T is requires a single DTW iteration for each combined sequence formed from a pair of reference sequences.

Returning to S807 of FIG. 9 (a), the averaged sequence is then saved in the vocabulary of stored signs. The averaged sequence replaces B sequences. Thus rather than storing B sequences in the vocabulary, a single averaged sequence is saved. Having a reduced training set in the stored vocabulary means that fewer comparisons with reference sequences are required during the classification. Using the combined sequences may provide improved accuracy of the classification.

Increasing the number of items in the stored vocabulary, for example the number of different signs, may reduce the accuracy of the classification. However, optionally, the user may train additional signs without a decrease in accuracy by separating those signs into multiple "sub-libraries". The user then picks which sub-library of signs to use before starting classification. This method involves storing multiple entirely separate libraries of reference signs to use for classification. It also allows the user to encode a single gesture to correspond to different labels depending on which sub-library they have stored it in. This may allow the user to use the sub-libraries in a context-sensitive way, such as a library for home, one for work, one for getting coffee, where they can tailor the output for the sign to that scenario.

The system is configured to track hand shapes (using flex sensors) and dynamic movement (using the gyroscope and/or accelerometer). Recorded sensor data is then used to train a K-Nearest Neighbours personal classifier using Dynamic Time Warping (DTW) as a similarity measure. The system provides machine translation from hand gestures to written languages. Further extension to spoken languages in the form of audio output may also be included. The system facilitates communications between individuals with speech disabilities and the general public, as well as between individuals with speech disabilities and traditionally voice-activated devices, or as a text input system in transcription systems for dictating messages, for example.

Figure 2C:
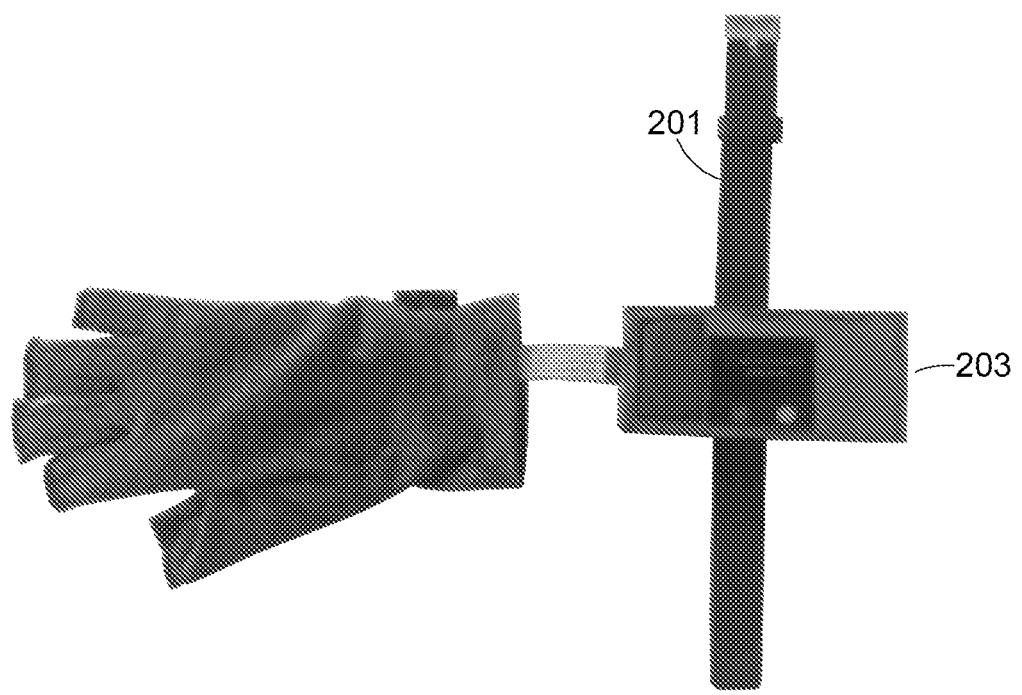
Figure 3A:
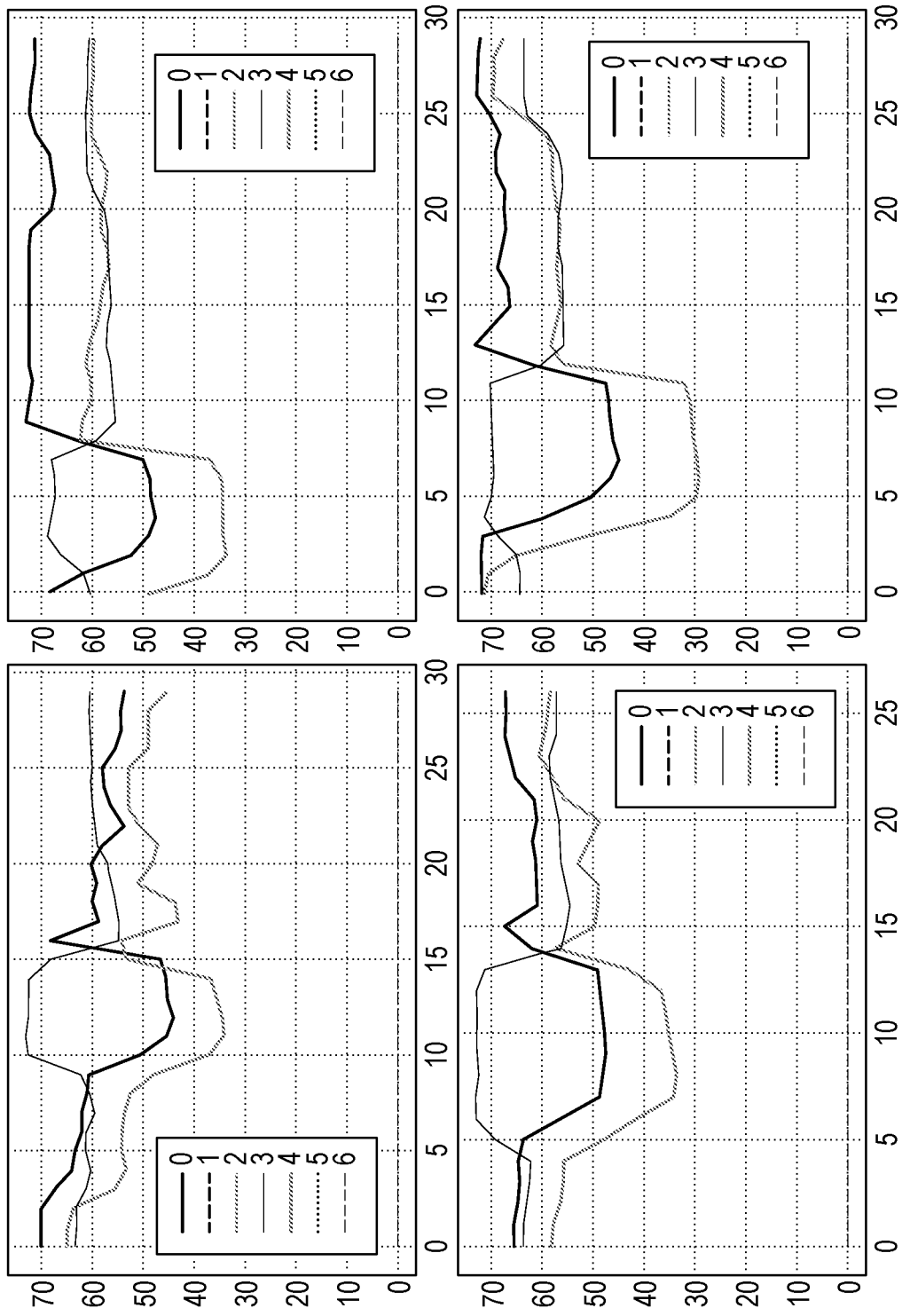
FIGS. 3(a) to 3(d) show examples of sensor data corresponding to various signs.
Figure 3B:
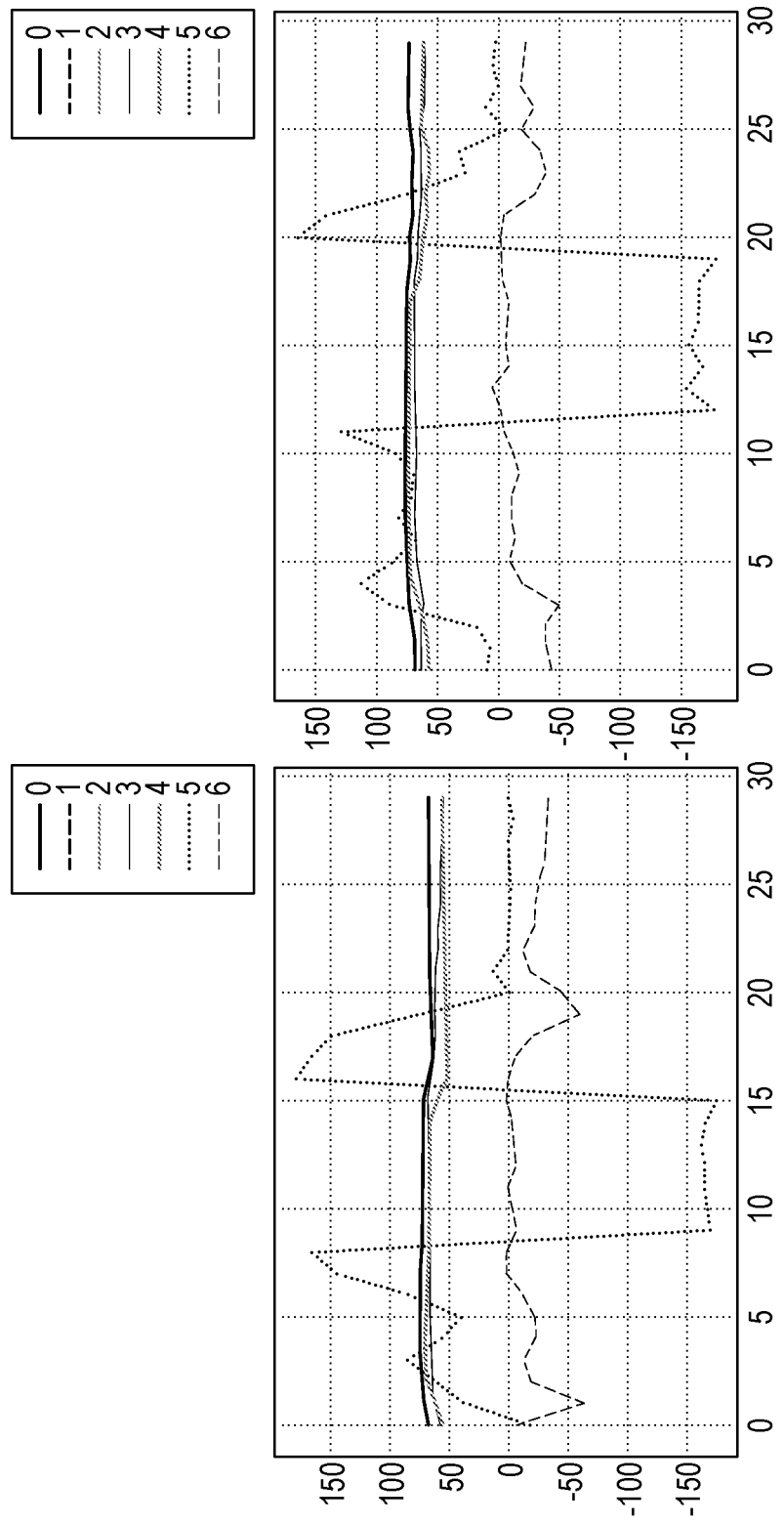
Figure 3C:
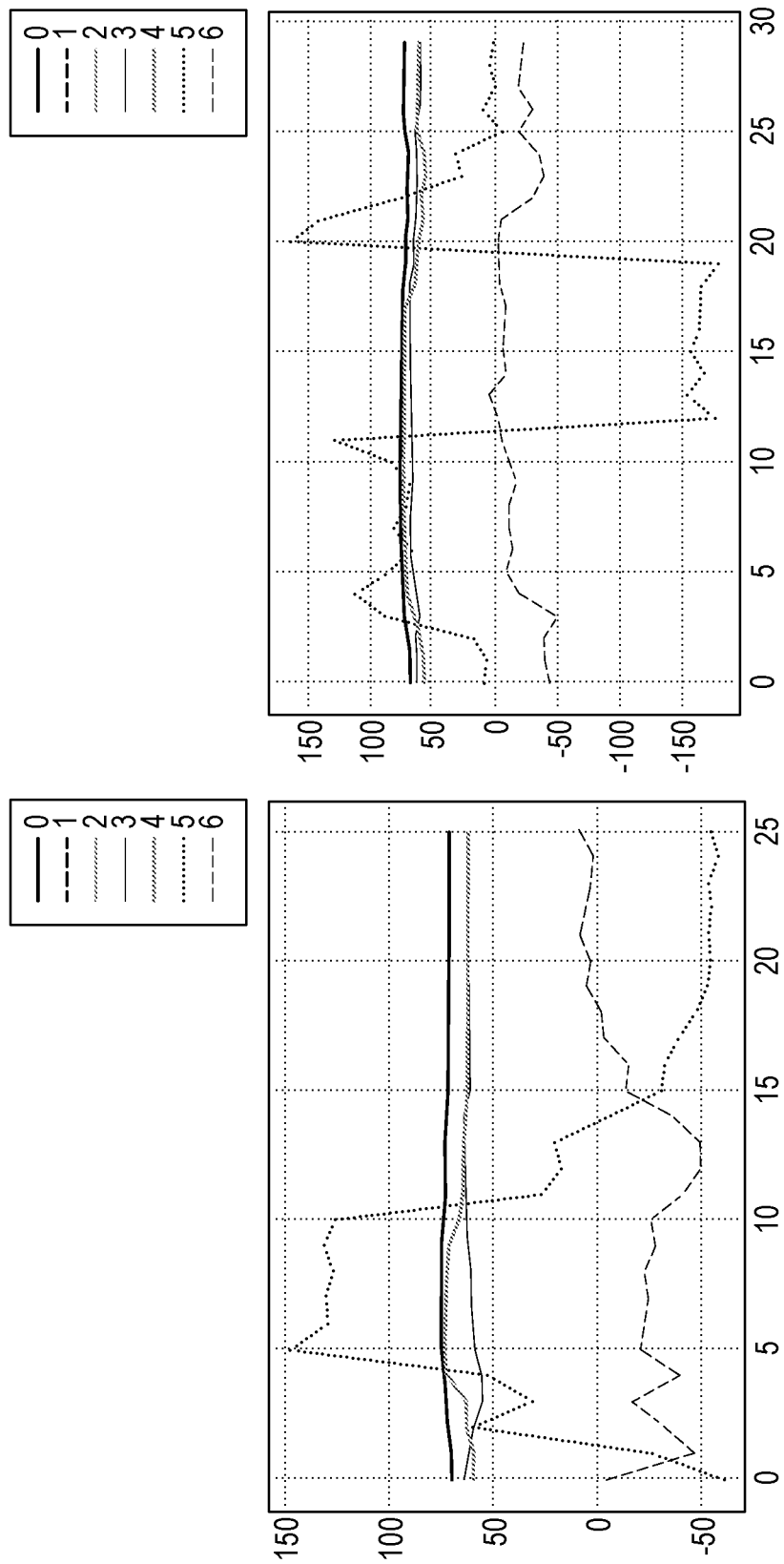
Figure 3D:
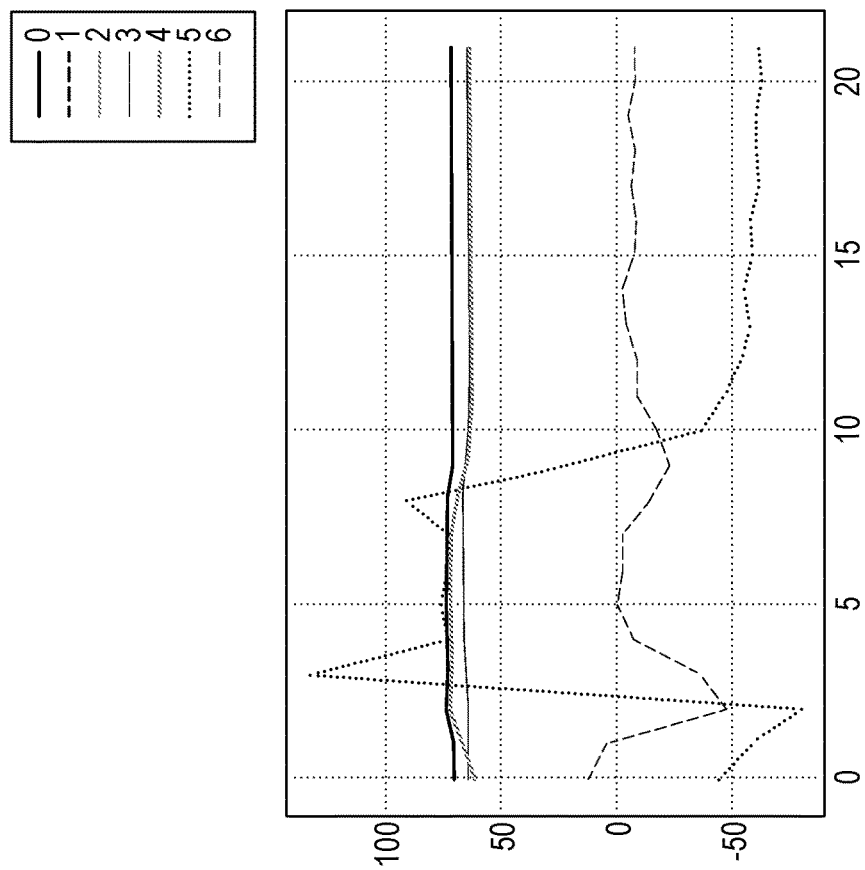
Figure 3D:
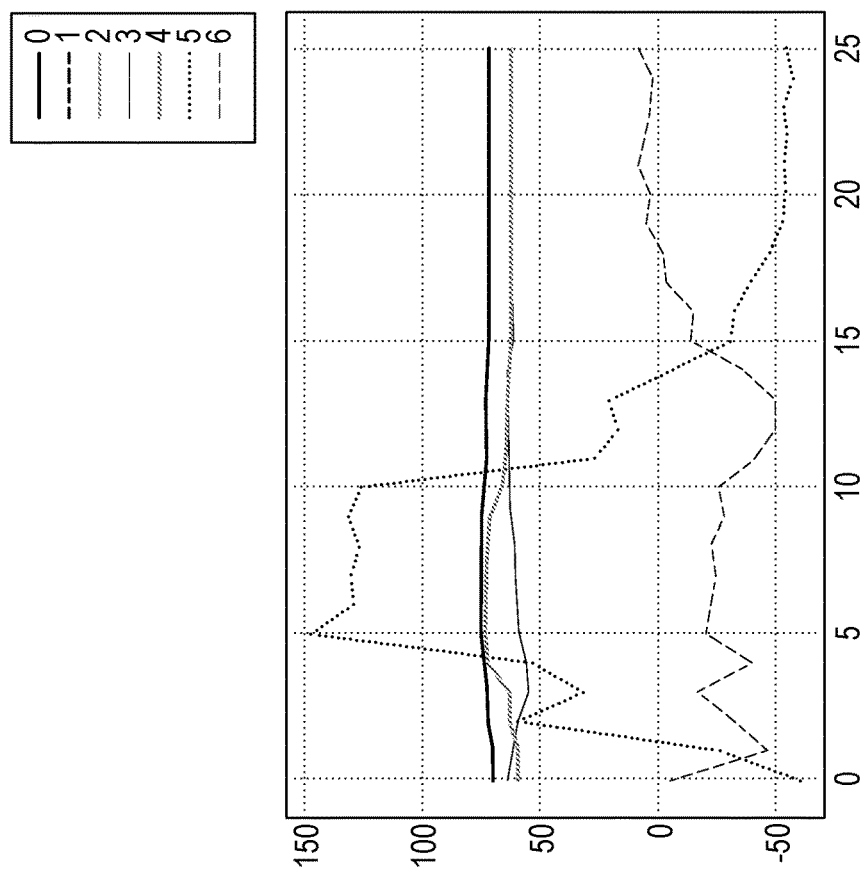

The example device shown in FIG. 2(c) was tested to determine the accuracy of classification. Accuracy is defined as the number of correct predictions divided by the total number of predictions. The accuracy of personal classifiers trained with data collected through supervised training sessions conducted at special schools with non-verbal students is compared to that obtained with a general classifier trained by the group data.

The device was tested on 10 non-verbal participants, between the ages of 5 and 15 years old. Selection criteria was based on familiarity with a form of sign language, and consistency in signing. The training session was a two hour long task broken into four, fifteen minute segments. Participants were first shown how to use the glove to record signs. This training was done with the researcher and the participant's speech therapist in attendance. As has been described above, the glove has two modes: Training and Classifying. To train the classifier, each participant recorded 10 sign samples for each word by pressing the record button before and after making the hand gesture. Gesture data was captured at 20 frames per second. To classify signs, the participant then switched to Classifying mode on the glove and made a sign. If the sign had a match it was displayed as text on the screen and spoken as speech through the speaker. If no match was found, the screen displayed a 'failed' message and returned to Classifying mode, waiting for new signs. If a sign continued to give a failed message it would be re-trained. The newly recorded samples would then replace the old ones for that sign.

Each operator was provided the glove shown in FIG. 2(c) and the gloves were configured with a predetermined list of 10 words (e.g. Yes, No, Stop, Help, Thank you . . . ) in the stored vocabulary. The participants each trained their gloves using the method illustrated in FIG. 8. Each participant saved 10 reference sequences for each of the 10 words. Once the glove is calibrated, participants performed one of the predetermined gestures, and the prediction of the glove was noted. Each participant performed between 30 and 40 gestures. 8 out of 10 participants had 100% classification accuracy while 2 had 95% accuracy.

A second trial was performed where the identical classifier was trained with the aggregate of all of the participants' data, excluding the user whose data was being classified in each instance. A classifier trained in this manner is termed a general classifier. The participants above performed the same test using the general classifier.

The performance of the personal classifier and the general classifier is illustrated in the table below. For all participants, the accuracy of the personal classifier exceeds that of the general classifier.

TABLE 1

| Participant | Personalized Classifier | General Classifier |
|---|---|---|
| Participant 1 | 100.00% | 87.88% |
| Participant 2 | 100.00% | 95.24% |
| Participant 3 | 100.00% | 89.74% |
| Participant 4 | 100.00% | 82.05% |
| Participant 5 | 94.74% | 52.60% |
| Participant 6 | 100.00% | 96.97% |
| Participant 7 | 94.74% | 89.47% |
| Participant 8 | 100.00% | 97.22% |
| Participant 9 | 100.00% | 77.78% |
| Participant 10 | 100.00% | 85.71% |

The number of samples recorded for each sign as part of the training was seen to impact the accuracy.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A method of gesture recognition comprising:
receiving data from each of a first sensor, a second sensor, a third sensor and a fourth sensor in a wearable glove device, data from the first sensor relating to movement of a thumb, data from the second sensor relating to movement of a first finger, data from the third sensor relating to movement of a middle finger and data from the fourth sensor relating to movement of a hand;
forming an input sequence from the data;
comparing the input sequence to each of a plurality of reference sequences by applying dynamic time warping to determine a similarity measure, wherein each reference sequence corresponds to an item in a stored vocabulary; and determining an output item from the stored vocabulary using the similarity measure,
wherein the input sequence comprises a sequence of vectors, each vector comprising a value from each sensor, and each reference sequence comprises a sequence of vectors, each vector comprising a value from each sensor,
wherein applying dynamic time warping comprises:
   determining a distance between a vector in the input sequence and a vector in the reference sequence; and
wherein applying dynamic time warping further comprises:
   reducing the dimension of the input sequence and the reference sequence;
   determining a warp path of the reduced dimension input sequence and reference sequence, wherein determining the warp path comprises determining a distance between a vector in the reduced dimension input sequence and a vector in the reduced dimension reference sequence; and
   determining a similarity measure by limiting calculation to within a radius r of the warp path.

2. A method according to claim 1, wherein determining an output item comprises:
   ordering the reference sequences according to the similarity measures;
   selecting the K highest entries, where K is a pre-determined positive integer; and
   selecting an item that appears most often in the list of K highest entries as the output item.

3. The method according to claim 1, wherein determining an output item comprises:
   ordering the reference sequences according to their similarity measures;
   selecting the reference sequence having a similarity measure corresponding to the highest similarity;
   determining if the similarity measure of the selected reference sequence satisfies a threshold value;
   if the similarity measure of the selected reference sequence satisfies the threshold value:
      selecting the K highest entries, where K is a pre-determined positive integer, and
      selecting an item that appears most often in the list of K highest entries as the output item.

4. The method according to claim 3, wherein if the similarity measure of the selected reference sequence does not satisfy the threshold value, the input sequence is updated to correspond to a subsequent time window.

5. The method according to claim 1, wherein an audio signal corresponding to the output item is retrieved and output.

6. The method according to claim 1, wherein a normalisation function is applied to the elements of the input sequence for each sensor.

7. The method according to claim 1, wherein the input sequence is formed by acquiring data from the sensors at a frame rate of greater than or equal to 4 frames per second.

8. The method according to claim 1, further comprising:
   performing a training step comprising: receiving data from each of the first sensor, second sensor, third sensor and fourth sensor corresponding to a known item, forming a reference sequence from the data and storing the reference sequence.

9. The method according to claim 8, wherein two or more reference sequences are stored for each item.

10. The method according to claim 9, wherein a first number of reference sequences is obtained corresponding to a first item, and wherein each of the first number of reference sequences is filtered to form a smoothed reference sequence.

11. The method according to claim 10, wherein the first number of reference sequences are combined to form a combined reference sequence.

12. The method according to claim 11, wherein the first number of reference sequences are combined using a Dynamic Time Warping Barycenter Averaging algorithm.

13. The method according to claim 11, wherein pairs of sequences from the first number of reference sequences are combined according to their warp path.

14. A system for gesture recognition, comprising:
   a first sensor in a wearable glove device, the first sensor configured to measure data relating to movement of a thumb;
   a second sensor in the glove device, the second sensor configured to measure data relating to movement of a first finger;
   a third sensor in the glove device, the third sensor configured to measure data relating to movement of a middle finger;
   a fourth sensor in the glove device, the fourth sensor configured to measure data relating to movement of a hand;
   an output means configured to output an audio or visual signal corresponding to a determined item; and
   a processor, configured to:
      receive data from each of the sensors;
      form an input sequence from the data;
      compare the input sequence to each of a plurality of reference sequences by applying dynamic time warping to determine a similarity measure, wherein each reference sequence corresponds to an item in a stored vocabulary; and
      determine an output item from the stored vocabulary using the similarity measure,
   wherein the input sequence comprises a sequence of vectors, each vector comprising a value from each sensor, and each reference sequence comprises a sequence of vectors, each vector comprising a value from each sensor,
   wherein applying dynamic time warping comprises:
      determining a distance between a vector in the input sequence and a vector in the reference sequence; and
   wherein applying dynamic time warping further comprises:
      reducing the dimension of the input sequence and the reference sequence;
      determining a warp path of the reduced dimension input sequence and reference sequence, wherein determining the warp path comprises determining a distance between a vector in the reduced dimension input sequence and a vector in the reduced dimension reference sequence; and
      determining a similarity measure by limiting calculation to within a radius r of the warp path.

15. The system according to claim 14, wherein the output means is located on the glove device.

16. The system according to claim 15, wherein the processor is located on the glove device.

17. A non-transitory computer readable storage medium comprising computer readable code configured to cause a computer to:
   receive data from each of a first sensor, a second sensor, a third sensor and a fourth sensor in a wearable glove device, data from the first sensor relating to movement of a thumb, data from the second sensor relating to movement of a first finger, data from the third sensor relating to movement of a middle finger and data from the fourth sensor relating to movement of a hand;

form an input sequence from the data;

compare the input sequence to each of a plurality of reference sequences by applying dynamic time warping to determine a similarity measure, wherein each reference sequence corresponds to an item in a stored vocabulary; and determine an output item from the stored vocabulary using the similarity measure;

wherein the input sequence comprises a sequence of vectors, each vector comprising a value from each sensor, and each reference sequence comprises a sequence of vectors, each vector comprising a value from each sensor, wherein applying dynamic time warping comprises:
  determining a distance between a vector in the input sequence and a vector in the reference sequence; and wherein applying dynamic time warping further comprises:
  reducing the dimension of the input sequence and the reference sequence;
  determining a warp path of the reduced dimension input sequence and reference sequence, wherein determining the warp path comprises determining a distance between a vector in the reduced dimension input sequence and a vector in the reduced dimension reference sequence; and
  determining a similarity measure by limiting calculation to within a radius r of the warp path.

* * * * *